US011886204B2

(12) United States Patent
Chen et al.

(10) Patent No.: US 11,886,204 B2
(45) Date of Patent: Jan. 30, 2024

(54) UNMANNED AERIAL VEHICLE AND SUPERVISION METHOD AND MONITORING SYSTEM FOR FLIGHT STATE THEREOF

(71) Applicant: SZ DJI TECHNOLOGY CO., LTD., Shenzhen (CN)

(72) Inventors: Ming Chen, Shenzhen (CN); Ming Gong, Shenzhen (CN); Yongsen Chen, Shenzhen (CN); Zhun Ding, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 644 days.

(21) Appl. No.: 17/025,913

(22) Filed: Sep. 18, 2020

(65) Prior Publication Data
US 2021/0004025 A1 Jan. 7, 2021

Related U.S. Application Data

(63) Continuation of application No. 16/003,347, filed on Jun. 8, 2018, now Pat. No. 10,796,587, which is a continuation of application No. PCT/CN2015/097067, filed on Dec. 10, 2015.

(51) Int. Cl.
*G05D 1/10* (2006.01)
*G01S 3/02* (2006.01)
(Continued)

(52) U.S. Cl.
CPC ............... *G05D 1/106* (2019.05); *G01S 3/02* (2013.01); *G05D 1/10* (2013.01); *G05D 1/101* (2013.01);
(Continued)

(58) Field of Classification Search
CPC .. G08G 5/0026; G08G 5/0082; G08G 5/0091; G08G 5/0047; G01C 23/00
See application file for complete search history.

(56) References Cited

U.S. PATENT DOCUMENTS 9,102,406 B2  8/2015  Stark et al.
9,412,278 B1  8/2016  Gong et al.
(Continued)

FOREIGN PATENT DOCUMENTS

CN    101833870 A    9/2010
CN    104359473 A    2/2015
(Continued)

OTHER PUBLICATIONS

The World Intellectual Property Organization (WIPO) International Search Report for PCT/CN2015/097067 dated May 11, 2016 6 Pages (including translation).

*Primary Examiner* — Shon G Foley
(74) *Attorney, Agent, or Firm* — ANOVA LAW GROUP, PLLC

(57) ABSTRACT

A supervision method for a flight state of an unmanned aerial vehicle includes respectively establishing communication connections with the unmanned aerial vehicle and a supervision server, receiving identity information about the unmanned aerial vehicle and flight information about the unmanned aerial vehicle sent by the unmanned aerial vehicle, automatically sending the identity information about the unmanned aerial vehicle and the flight information to the supervision server in an on-line mode, receiving at least one of a flight restriction instruction or warning information sent by the supervision server, and forwarding the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

18 Claims, 13 Drawing Sheets

(51) Int. Cl.
*G08G 5/00* (2006.01)
*B64C 39/02* (2023.01)

(52) U.S. Cl.
CPC .......... *G08G 5/006* (2013.01); *G08G 5/0013* (2013.01); *G08G 5/0069* (2013.01); *G08G 5/0082* (2013.01); *B64C 39/024* (2013.01); *B64U 2201/20* (2023.01)

(56) References Cited

U.S. PATENT DOCUMENTS

| | | |
|---|---|---|
| 9,696,725 B2 | 7/2017 | Wang et al. |
| 2011/0046817 A1* | 2/2011 | Hamke .................. G05D 1/101 |
| | | 701/3 |
| 2012/0143482 A1* | 6/2012 | Goossen .............. G08G 5/0069 |
| | | 701/120 |
| 2014/0249693 A1 | 9/2014 | Stark et al. |
| 2015/0379874 A1 | 12/2015 | Ubhi et al. |
| 2016/0225264 A1* | 8/2016 | Taveira ................. H04W 48/04 |
| 2017/0154536 A1 | 6/2017 | Kreiner et al. |
| 2019/0103030 A1 | 4/2019 | Banga et al. |

FOREIGN PATENT DOCUMENTS

| | | |
|---|---|---|
| CN | 104615143 A | 5/2015 |
| CN | 104820431 A | 8/2015 |
| CN | 104950907 A | 9/2015 |
| DE | 102006056937 A1 | 6/2008 |
| DE | 102006056937 B4 | 7/2010 |
| WO | 2014077913 A2 | 5/2014 |
| WO | 2015114572 A1 | 8/2015 |

\* cited by examiner

UNMANNED AERIAL VEHICLE AND SUPERVISION METHOD AND MONITORING SYSTEM FOR FLIGHT STATE THEREOF

CROSS-REFERENCE TO RELATED APPLICATIONS

This application is a continuation of application Ser. No. 16/003,347, filed Jun. 8, 2018, which is a continuation of International Application No. PCT/CN2015/097067, filed on Dec. 10, 2015, the entire contents of both of which are incorporated herein by reference.

FIELD OF THE DISCLOSURE

The present disclosure relates to the technical field of safe flight monitoring of miniature unmanned aerial vehicles in low altitude areas, and in particular to an unmanned aerial vehicle and a supervision method and monitoring system for a flight state thereof.

BACKGROUND ART

The unmanned aerial vehicle is an aircraft mainly active in the low altitude area, which mainly depends on a remote controller to control the flight thereof. Since the flight environment of the low altitude area is relatively complex and is easily restricted by a small number of flight prohibited regions, the government and security department need to supervise unmanned aerial vehicles to guarantee social security. An effective aviation supervision system needs to obtain flight data of an aircraft, comprising the flight time, longitude and latitude, altitude, speed, heading, etc. Existing aviation supervision systems normally require an aircraft to be equipped with active devices such as a high-frequency communication device, a secondary radar responder and an automatic dependent surveillance-broadcast (ADS-B) device to provide flight information about the aircraft itself during flight. However, these devices are large in both volume and weight, and cannot be installed on a miniature unmanned aerial vehicle. In addition, by means of passive monitoring of a ground-based radar, since the size of a miniature unmanned aerial vehicle is relatively small while the blind zone of ground monitoring is relatively large, it cannot be monitored effectively either. Therefore, the existing aviation supervision system cannot effectively acquire flight data of a miniature unmanned aerial vehicle by its own technical means. Moreover, the flight data of the existing miniature unmanned aerial vehicle is stored in a storage apparatus of the unmanned aerial vehicle, and a user needs to return the unmanned aerial vehicle and then read flight information stored therein, which makes the acquisition of the flight data relatively delayed. If the user does not actively read and upload the data, the supervisor cannot acquire it either.

SUMMARY OF THE DISCLOSURE

In view of this, it is necessary to propose an unmanned aerial vehicle and a supervision method and monitoring system for a flight state thereof to solve the problems mentioned above.

A supervision method for a flight state of an unmanned aerial vehicle, which is applied in a supervision server, comprises the steps of:
establishing a communication connection with a control terminal of the unmanned aerial vehicle;
receiving off-line flight application information sent by the control terminal, wherein the off-line flight application information comprises identity information and off-line flight parameters;
generating, according to the off-line flight application information, an off-line flight certificate for the unmanned aerial vehicle, wherein the off-line flight certificate contains the off-line flight application information; and
receiving and responding to a request signal which is sent by the control terminal and used for downloading the off-line flight certificate, and sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the off-line flight parameters further comprise: the highest flight altitude, the farthest flight distance, and the maximum flight speed.

Furthermore, the supervision method further comprises: updating an unmanned aerial vehicle deployment map according to the off-line flight application information.

Furthermore, the off-line flight application information is received via an on-line application platform.

Furthermore, the step of receiving off-line flight application information sent by the control terminal specifically comprises:
providing a front-end application interface for the off-line flight certificate, and displaying the front-end application interface on the control terminal; and
receiving the off-line flight application information input in the front-end application interface.

Furthermore, after the step of receiving off-line flight application information sent by the control terminal, the method further comprises:
establishing a communication connection with a third-party authentication platform, and sending the identity information about a user of the unmanned aerial vehicle to the third-party authentication platform for authentication; and
if the third-party authentication platform successfully authenticates the identity information about a user of the unmanned aerial vehicle, generating, according to the off-line flight application information, the off-line flight certificate.

Furthermore, prior to the step of generating, according to the off-line flight application information, an off-line flight certificate for the unmanned aerial vehicle, the method further comprises:
displaying a back-end application interface for the off-line flight certificate; and
receiving approval information in the back-end application interface for the off-line flight parameters input in the front-end application interface.

Furthermore, the supervision method further comprises:
providing a front-end query and modification interface for the off-line flight certificate associated with the identity information about a user of the unmanned aerial vehicle and/or the identity information about the unmanned aerial vehicle, and displaying the front-end query and modification interface on the control terminal;

receiving off-line flight parameters which have been modified in the front-end query and modification interface; and updating, according to the modified off-line flight parameters, information in the off-line flight certificate, and pushing the updated off-line flight certificate to the corresponding control terminal in real time.

Furthermore, the supervision method further comprises:

displaying a back-end query and modification interface for the off-line flight certificate associated with the identity information about a user of the unmanned aerial vehicle and/or the identity information about the unmanned aerial vehicle;

receiving off-line flight parameters which have been modified in the back-end query and modification interface; and updating, according to the modified off-line flight parameters, information in the off-line flight certificate, and pushing the updated off-line flight certificate to the corresponding control terminal in real time.

Furthermore, the communication connection is established with the control terminal via a mobile communication network and/or in a wireless access manner.

A supervision method for a flight state of an unmanned aerial vehicle, which is applied in a supervision server, comprises the steps of:

receiving off-line flight application information about the unmanned aerial vehicle, wherein the off-line flight application information comprises identity information and off-line flight parameters;

generating, according to the off-line flight application information, an off-line flight certificate for the unmanned aerial vehicle, wherein the off-line flight certificate contains the off-line flight application information; and providing the off-line flight certificate to the unmanned aerial vehicle, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the off-line flight application information is received via an on-line application platform.

Furthermore, prior to the step of providing the off-line flight certificate to the unmanned aerial vehicle, thereby restricting flight behaviour of the unmanned aerial vehicle in an off-line flight mode according to the off-line flight certificate, the method further comprises:

establishing a communication connection with a control terminal of the unmanned aerial vehicle, and receiving and responding to a request signal which is sent by the control terminal and used for downloading the off-line flight certificate.

Furthermore, the supervision method further comprises:

sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Furthermore, the supervision method further comprises: updating an unmanned aerial vehicle deployment map according to the off-line flight application information.

A monitoring system for a flight state of an unmanned aerial vehicle, which is applied in a supervision server, comprises:

a control module for establishing a communication connection with a control terminal of the unmanned aerial vehicle via a communication apparatus of the supervision server;

a receiving module for receiving off-line flight application information sent by the control terminal, wherein the off-line flight application information comprises identity information and off-line flight parameters; and a certificate generation module for generating, according to the off-line flight application information, an off-line flight certificate for the unmanned aerial vehicle, wherein the off-line flight certificate contains the off-line flight application information; and the control module being further used for receiving and responding to a request signal which is sent by the control terminal and used for downloading the off-line flight certificate, and sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the off-line flight parameters further comprise: the highest flight altitude, the farthest flight distance, and the maximum flight speed.

Furthermore, the control module is further used for updating an unmanned aerial vehicle deployment map according to the off-line flight application information.

Furthermore, the receiving module receives the off-line flight application information via an on-line application platform.

Furthermore, the receiving module receives the off-line flight application information via an on-line application platform.

Furthermore, the certificate generation module is further used for providing a front-end application interface for the off-line flight certificate;

the control module is further used for displaying the front-end application interface on the control terminal; and the receiving module is used for receiving the off-line flight application information input in the front-end application interface.

Furthermore, the control module is further used for establishing a communication connection with a third-party authentication platform, and sending the identity information about a user of the unmanned aerial vehicle to the third-party authentication platform for authentication; and the certificate generation module is used for, after the third-party authentication platform successfully authenticates the identity information about a user of the unmanned aerial vehicle, generating, according to the off-line flight application information, the off-line flight certificate.

Furthermore, the certificate generation module is further used for displaying a back-end application interface for the off-line flight certificate on a display screen of the supervision server; and the receiving module is further used for receiving approval information in the back-end application interface for the off-line flight parameters input in the front-end application interface.

Furthermore, the certificate generation module is further used for providing a front-end query and modification interface for the off-line flight certificate associated with the identity information about a user of the unmanned aerial vehicle and/or the identity information about the unmanned aerial vehicle;

the control module is further used for displaying the front-end query and modification interface on the control terminal;
the receiving module is further used for receiving off-line flight parameters which have been modified in the front-end query and modification interface;
the certificate generation module is further used for updating, according to the modified off-line flight parameters, information in the off-line flight certificate; and
the control module is further used for pushing the updated off-line flight certificate to the corresponding control terminal in real time.

Furthermore, the certificate generation module is further used for displaying a back-end query and modification interface for the off-line flight certificate associated with the identity information about a user of the unmanned aerial vehicle and/or the identity information about the unmanned aerial vehicle on a display screen of the supervision server;

the receiving module is further used for receiving off-line flight parameters which have been modified in the back-end query and modification interface;
the certificate generation module is further used for updating, according to the modified off-line flight parameters, information in the off-line flight certificate; and
the control module is further used for pushing the updated off-line flight certificate to the corresponding control terminal in real time.

A processor, which is applied in a supervision server, is used for acquiring program instructions stored in a storage apparatus to perform the steps of:

establishing a communication connection with a control terminal of the unmanned aerial vehicle;
receiving off-line flight application information sent by the control terminal, wherein the off-line flight application information comprises identity information and off-line flight parameters;
generating, according to the off-line flight application information, an off-line flight certificate for the unmanned aerial vehicle, wherein the off-line flight certificate contains the off-line flight application information; and
receiving and responding to a request signal which is sent by the control terminal and used for downloading the off-line flight certificate, and sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the off-line flight parameters further comprise: the highest flight altitude, the farthest flight distance, and the maximum flight speed.

A processor, which is applied in a supervision server, is used for acquiring program instructions stored in a storage apparatus to perform the steps of:

receiving off-line flight application information about the unmanned aerial vehicle, wherein the off-line flight application information comprises identity information and off-line flight parameters;
generating, according to the off-line flight application information, an off-line flight certificate for the unmanned aerial vehicle, wherein the off-line flight certificate contains the off-line flight application information; and
providing the off-line flight certificate to the unmanned aerial vehicle, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the off-line flight parameters further comprise: the highest flight altitude, the farthest flight distance, and the maximum flight speed.

A memory, which is applied in a supervision server, is used for storing program instructions, wherein the program instructions can be acquired by a processor to perform the steps of:

establishing a communication connection with a control terminal of the unmanned aerial vehicle;
receiving off-line flight application information sent by the control terminal, wherein the off-line flight application information comprises identity information and off-line flight parameters;
generating, according to the off-line flight application information, an off-line flight certificate for the unmanned aerial vehicle, wherein the off-line flight certificate contains the off-line flight application information; and
receiving and responding to a request signal which is sent by the control terminal and used for downloading the off-line flight certificate, and sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the off-line flight parameters further comprise: the highest flight altitude, the farthest flight distance, and the maximum flight speed.

A supervision method for a flight state of an unmanned aerial vehicle, which is applied in a supervision server, comprises the steps of:

establishing a communication connection with a control terminal of the unmanned aerial vehicle;

receiving identity information about the unmanned aerial vehicle and flight information about the unmanned aerial vehicle sent by the control terminal;

determining, according to pre-set safe flight parameters, whether the flight information about the unmanned aerial vehicle conforms to a flight safety regulation; and if it is determined that the flight information about the unmanned aerial vehicle violates the flight safety regulation, generating a corresponding flight restriction instruction and/or warning information, and sending the flight restriction instruction and/or warning information to the control terminal, thereby restricting flight behaviour of the unmanned aerial vehicle in an on-line flight mode via the flight restriction instruction and/or warning information.

Furthermore, the flight information comprises location information about and heading of the unmanned aerial vehicle; the pre-set safe flight parameters comprise at least longitude and latitude of a sensitive region associated with the identity information about the unmanned aerial vehicle, the pre-set sensitive region comprising at least one of the following: a flight restricted region and a flight prohibited region; and the supervision method specifically comprises:

determining, according to the identity information about the unmanned aerial vehicle and the flight information, whether the unmanned aerial vehicle has entered or is about to enter a pre-set sensitive region; and if it is determined that the unmanned aerial vehicle is about to enter or has entered the pre-set sensitive region, generating a corresponding flight restriction instruction and/or warning information, the warning information at least comprising: heading change information, and the flight restriction instruction comprising at least one of the following: a forced heading change instruction, a forced landing instruction, and a start prohibited instruction.

Furthermore, the flight information comprises a variety of flight parameters of the unmanned aerial vehicle, the flight parameters at least comprising: a flight altitude and a flight speed; the pre-set safe flight parameters comprise at least the highest safe flight altitude and the maximum safe flight speed associated with the identity information about a user of the unmanned aerial vehicle; and the supervision method specifically further comprises:

monitoring the flight state of the unmanned aerial vehicle according to the identity information about the unmanned aerial vehicle and the flight information, and determining whether the flight parameters of the unmanned aerial vehicle exceed the pre-set safe flight parameters; and if it is determined that the flight parameters of the unmanned aerial vehicle exceed the pre-set safe flight parameters, generating a corresponding flight restriction instruction and/or warning information, the warning information comprising at least one of the following: altitude lowering information and speed lowering information, and the flight restriction instruction comprising at least one of the following: a forced altitude lowering instruction and a forced speed lowering instruction.

Furthermore, the supervision method further comprises:
setting aerial information associated with the identity information about the unmanned aerial vehicle in real time, and pushing the aerial information to the control terminal in real time, the aerial information at least comprising longitude and latitude of a sensitive region, and the sensitive region comprising at least one of the following: a flight restricted region and a flight prohibited region.

Furthermore, the step of setting aerial information associated with the identity information about the unmanned aerial vehicle in real time specifically comprises:

receiving an input parameter, and setting aerial information associated with the identity information about the unmanned aerial vehicle according to the input parameter; and/or automatically setting the aerial information associated with the identity information about the unmanned aerial vehicle in real time according to the flight information.

Furthermore, the supervision method further comprises: an unmanned aerial vehicle deployment map is updated according to the flight information about the unmanned aerial vehicle.

Furthermore, the communication connection is established with the control terminal via a mobile communication network and/or in a wireless access manner.

A supervision method for a flight state of an unmanned aerial vehicle, which is applied in a supervision server, comprises the steps of:

receiving identity information about the unmanned aerial vehicle and flight information about the unmanned aerial vehicle;

determining, according to pre-set safe flight parameters, whether the flight information about the unmanned aerial vehicle conforms to a flight safety regulation; and if it is determined that the flight information about the unmanned aerial vehicle violates the flight safety regulation, generating a corresponding flight restriction instruction, and sending the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

Furthermore, a communication connection is established with the unmanned aerial vehicle directly or indirectly.

Furthermore, the flight restriction instruction is a flight pre-warning instruction or a flight control instruction.

Furthermore, an unmanned aerial vehicle deployment map is updated according to the flight information about the unmanned aerial vehicle.

A monitoring system for a flight state of an unmanned aerial vehicle, which is applied in a supervision server, comprises:

a control module for establishing a communication connection with a control terminal of the unmanned aerial vehicle via a communication apparatus of the supervision server;

a receiving module for receiving identity information about the unmanned aerial vehicle and flight information about the unmanned aerial vehicle sent by the control terminal;

a safety decision-making module for determining, according to pre-set safe flight parameters, whether the flight information about the unmanned aerial vehicle conforms to a flight safety regulation; and for generating, when it is determined that the flight information about the unmanned aerial vehicle violates the flight safety regulation, a corresponding flight restriction instruction and/or warning information; and the control module is further used for controlling the communication apparatus to send the flight restriction instruction and/or warning information to the control terminal, thereby restricting flight behaviour of the unmanned aerial vehicle in an on-line flight mode via the flight restriction instruction and/or warning information.

Furthermore, the flight information comprises location information about and heading of the unmanned aerial vehicle; the pre-set safe flight parameters comprise at least longitude and latitude of a sensitive region associated with the identity information about the unmanned aerial vehicle, the pre-set sensitive region comprising at least one of the following: a flight restricted region and a flight prohibited region; and the safety decision-making module is specifically used for:
- determining, according to the identity information about the unmanned aerial vehicle and the flight information, whether the unmanned aerial vehicle has entered or is about to enter a pre-set sensitive region; and
- if it is determined that the unmanned aerial vehicle is about to enter or has entered the pre-set sensitive region, generating a corresponding flight restriction instruction and/or warning information, the warning information at least comprising: heading change information, and the flight restriction instruction comprising at least one of the following: a forced heading change instruction, a forced landing instruction, and a start prohibited instruction.

Furthermore, the flight information comprises a variety of flight parameters of the unmanned aerial vehicle, the flight parameters at least comprising: a flight altitude and a flight speed; the pre-set safe flight parameters comprise at least the highest safe flight altitude and the maximum safe flight speed associated with the identity information about a user of the unmanned aerial vehicle; and the safety decision-making module is specifically further used for:
- monitoring the flight state of the unmanned aerial vehicle according to the identity information about the unmanned aerial vehicle and the flight information, and determining whether the flight parameters of the unmanned aerial vehicle exceed the pre-set safe flight parameters; and
- if it is determined that the flight parameters of the unmanned aerial vehicle exceed the pre-set safe flight parameters, generating a corresponding flight restriction instruction and/or warning information, the warning information comprising at least one of the following: altitude lowering information and speed lowering information, and the flight restriction instruction comprising at least one of the following: a forced altitude lowering instruction and a forced speed lowering instruction.

Furthermore, the monitoring system further comprises a setting module for setting aerial information associated with the identity information about the unmanned aerial vehicle in real time; and
- the control module is further used for controlling the communication apparatus to push the aerial information to the control terminal in real time, the aerial information at least comprising longitude and latitude of a sensitive region, and the sensitive region comprising at least one of the following: a flight restricted region and a flight prohibited region.

Furthermore, the setting module is specifically used for, when setting aerial information associated with the identity information about the unmanned aerial vehicle in real time:
- receiving an input parameter, and setting aerial information associated with the identity information about the unmanned aerial vehicle according to the input parameter; and/or
- automatically setting the aerial information associated with the identity information about the unmanned aerial vehicle in real time according to the flight information.

Furthermore, the control module is further used for updating an unmanned aerial vehicle deployment map according to the flight information about the unmanned aerial vehicle.

A processor, which is applied in a supervision server, is used for acquiring program instructions stored in a storage apparatus to perform the steps of:
- establishing a communication connection with a control terminal of the unmanned aerial vehicle;
- receiving identity information about the unmanned aerial vehicle and flight information about the unmanned aerial vehicle sent by the control terminal;
- determining, according to pre-set safe flight parameters, whether the flight information about the unmanned aerial vehicle conforms to a flight safety regulation; and
- if it is determined that the flight information about the unmanned aerial vehicle violates the flight safety regulation, generating a corresponding flight restriction instruction and/or warning information, and sending the flight restriction instruction and/or warning information to the control terminal, thereby restricting flight behaviour of the unmanned aerial vehicle in an on-line flight mode via the flight restriction instruction and/or warning information.

A processor, which is applied in a supervision server, is used for acquiring program instructions stored in a storage apparatus to perform the steps of:
- receiving identity information about the unmanned aerial vehicle and flight information about the unmanned aerial vehicle;
- determining, according to pre-set safe flight parameters, whether the flight information about the unmanned aerial vehicle conforms to a flight safety regulation; and
- if it is determined that the flight information about the unmanned aerial vehicle violates the flight safety regulation, generating a corresponding flight restriction instruction, and sending the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

A memory, which is applied in a supervision server, is used for storing program instructions, wherein the program instructions can be acquired by a processor to perform the steps of:
- establishing a communication connection with a control terminal of the unmanned aerial vehicle;
- receiving identity information about the unmanned aerial vehicle and flight information about the unmanned aerial vehicle sent by the control terminal;
- determining, according to pre-set safe flight parameters, whether the flight information about the unmanned aerial vehicle conforms to a flight safety regulation; and
- if it is determined that the flight information about the unmanned aerial vehicle violates the flight safety regulation, generating a corresponding flight restriction instruction and/or warning information, and sending the flight restriction instruction and/or warning information to the control terminal, thereby restricting flight behaviour of the unmanned aerial vehicle in an on-line flight mode via the flight restriction instruction and/or warning information.

A supervision method for a flight state of an unmanned aerial vehicle, which is applied in a control terminal, comprises the steps of:
- respectively establishing communication connections with the unmanned aerial vehicle and a supervision server;
- sending off-line flight application information to the supervision server, wherein the off-line flight application information comprises identity information and off-line flight parameters;
- sending to the supervision server a request signal for downloading an off-line flight certificate, and receiving an off-line flight certificate sent by the supervision server, wherein the off-line flight certificate contains the off-line flight application information; and
- forwarding the off-line flight certificate to the unmanned aerial vehicle, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the supervision method further comprises:
- switching, after having established a communication connection with the supervision server, the mode of the control terminal to an on-line mode, and sending an on-line signal to the unmanned aerial vehicle, so as to set the flight mode of the unmanned aerial vehicle to an on-line flight mode; and
- switching, after having terminated the communication connection with the supervision server, the mode of the control terminal to an off-line mode, and sending an off-line signal to the unmanned aerial vehicle, so as to set the flight mode of the unmanned aerial vehicle to an off-line flight mode.

Furthermore, data is transmitted from/to the supervision server via a mobile communication network and/or in a wireless access manner.

Furthermore, data is transmitted from/to the unmanned aerial vehicle via a mobile communication network and/or in a wireless transmission manner, the wireless access manner comprising a WIFI or Bluetooth manner.

A monitoring system for a flight state of an unmanned aerial vehicle, which is applied in a control terminal, comprises:
- a control module for respectively establishing communication connections with the unmanned aerial vehicle and a supervision server via a communication apparatus of the control terminal;
- the control module being further used for controlling the communication apparatus to send off-line flight application information to the supervision server, and sending to the supervision server a request signal for downloading an off-line flight certificate, wherein the off-line flight application information comprises identity information and off-line flight parameters;
- a receiving module for receiving an off-line flight certificate sent by the supervision server, wherein the off-line flight certificate contains the off-line flight application information; and
- the control module being further used for controlling the communication apparatus to forward the off-line flight certificate to the unmanned aerial vehicle, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

Furthermore, the monitoring system further comprises a setting module, the setting module being used for:
- switching, after having established a communication connection with the supervision server, the mode of the control terminal to an on-line mode, and sending an on-line signal to the unmanned aerial vehicle via the communication apparatus, so as to set the flight mode of the unmanned aerial vehicle to an on-line flight mode; and
- switching, after having terminated the communication connection with the supervision server, the mode of the control terminal to an off-line mode, and sending an off-line signal to the unmanned aerial vehicle via the communication apparatus, so as to set the flight mode of the unmanned aerial vehicle to an off-line flight mode.

A processor, which is applied in a control terminal, is used for acquiring program instructions stored in a storage apparatus to perform the steps of:
- respectively establishing communication connections with the unmanned aerial vehicle and a supervision server;
- sending off-line flight application information to the supervision server, wherein the off-line flight application information comprises identity information and off-line flight parameters;
- sending to the supervision server a request signal for downloading an off-line flight certificate, and receiving an off-line flight certificate sent by the supervision server, wherein the off-line flight certificate contains the off-line flight application information; and
- forwarding the off-line flight certificate to the unmanned aerial vehicle, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

A memory, which is applied in a control terminal, is used for storing program instructions, wherein the program instructions can be acquired by a processor to perform the steps of:
- respectively establishing communication connections with the unmanned aerial vehicle and a supervision server;
- sending off-line flight application information to the supervision server, wherein the off-line flight application information comprises identity information and off-line flight parameters;
- sending to the supervision server a request signal for downloading an off-line flight certificate, and receiving an off-line flight certificate sent by the supervision server, wherein the off-line flight certificate contains the off-line flight application information; and
- forwarding the off-line flight certificate to the unmanned aerial vehicle, thereby restricting flight behaviour of the unmanned aerial vehicle in an off-line flight mode according to the off-line flight certificate.

Furthermore, the identity information comprises identity information about a user of the unmanned aerial vehicle and identity information about the unmanned aerial vehicle, and the off-line flight parameters comprise at least: flight region information and a flight time.

A supervision method for a flight state of an unmanned aerial vehicle, which is applied in a control terminal, comprises the steps of:
  respectively establishing communication connections with the unmanned aerial vehicle and a supervision server;
  receiving identity information about the unmanned aerial vehicle and flight information about the unmanned aerial vehicle sent by the unmanned aerial vehicle;
  automatically sending the identity information about the unmanned aerial vehicle and the flight information to the supervision server in an on-line mode;
  receiving a flight restriction instruction and/or warning information sent by the supervision server; and
  forwarding the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

Furthermore, the warning information comprises at least one of the following: heading change information, speed lowering information and altitude lowering information, and the flight restriction instruction comprises at least one of the following: a forced heading change instruction, a forced landing instruction, a forced speed lowering instruction and a forced altitude lowering instruction.

Furthermore, the flight information comprises location information about the unmanned aerial vehicle and a variety of flight parameters of the unmanned aerial vehicle, the flight parameters at least comprising: a flight time, a flight altitude, a flight speed and a heading; and the supervision method further comprises:
  acquiring information about a map, and displaying the map;
  marking the location of the unmanned aerial vehicle on the map according to the location information;
  and/or, displaying the flight parameters of the unmanned aerial vehicle on the map.

Furthermore, the supervision method further comprises:
  receiving aerial information pushed by the supervision server, the aerial information at least comprising longitude and latitude of a sensitive region, and the sensitive region comprising at least one of the following: a flight restricted region and a flight prohibited region;
  acquiring information about a map, and displaying the map; and
  marking a flight restricted region and/or flight prohibited region on the map according to the aerial information.

Furthermore, the supervision method further comprises:
  prompting the flight restriction instruction and/or warning information by means of voice; or
  displaying the flight restriction instruction and/or warning information by means of text.

Furthermore, the supervision method further comprises:
  receiving aerial information pushed by the supervision server, and automatically forwarding the aerial information to the unmanned aerial vehicle, the aerial information at least comprising longitude and latitude of a sensitive region, and the sensitive region comprising at least one of the following: a flight restricted region and a flight prohibited region.

Furthermore, the supervision method further comprises:
  switching, after having established a communication connection with the supervision server, the mode of the control terminal to an on-line mode, and sending an on-line signal to the unmanned aerial vehicle, so as to set the flight mode of the unmanned aerial vehicle to an on-line flight mode; and
  switching, after having terminated the communication connection with the supervision server, the mode of the control terminal to an off-line mode, and sending an off-line signal to the unmanned aerial vehicle, so as to set the flight mode of the unmanned aerial vehicle to an off-line flight mode.

Furthermore, the supervision method further comprises:
  storing, when the control terminal receives in the off-line mode off-line flight information sent by the unmanned aerial vehicle, the received off-line flight information, and controlling, when the mode of the control terminal is switched to the on-line mode, the communication apparatus to send the off-line flight information to the supervision server; or
  receiving, when the mode of the control terminal is switched from the off-line mode to the on-line mode, the off-line flight information sent by the unmanned aerial vehicle, and automatically forwarding the off-line flight information to the supervision server.

Furthermore, data is transmitted from/to the supervision server via a mobile communication network and/or in a wireless access manner.

Furthermore, data is transmitted from/to the unmanned aerial vehicle via a mobile communication network and/or in a wireless transmission manner, the wireless access manner comprising a WIFI or Bluetooth manner.

A monitoring system for a flight state of an unmanned aerial vehicle, which is applied in a control terminal, comprises:
  a control module for respectively establishing communication connections with the unmanned aerial vehicle and a supervision server via a communication apparatus of the control terminal;
  a receiving module for receiving identity information about the unmanned aerial vehicle and flight information about the unmanned aerial vehicle sent by the unmanned aerial vehicle;
  The control module being further used for automatically sending the identity information about the unmanned aerial vehicle and the flight information to the supervision server in an on-line mode via the communication apparatus;
  the receiving module being further used for receiving a flight restriction instruction and/or warning information sent by the supervision server; and
  the control module being further used for forwarding, when having received a flight restriction instruction, the flight restriction instruction to the unmanned aerial vehicle via the communication apparatus, so that the unmanned aerial vehicle executes the flight restriction instruction, thereby restricting flight behaviour of the unmanned aerial vehicle in an on-line flight mode via the flight restriction instruction.

Furthermore, the warning information comprises at least one of the following: heading change information, speed lowering information and altitude lowering information, and the flight restriction instruction comprises at least one of the following: a forced heading change instruction, a forced landing instruction, a forced speed lowering instruction and a forced altitude lowering instruction.

Furthermore, the flight information comprises location information about the unmanned aerial vehicle and a variety of flight parameters of the unmanned aerial vehicle, the flight parameters at least comprising: a flight time, a flight altitude, a flight speed and a heading; and the control module is further used for:
- acquiring information about a map, and displaying the map on a display screen of the control terminal;
- marking the location of the unmanned aerial vehicle on the map according to the location information;
- and/or, displaying the flight parameters of the unmanned aerial vehicle on the map.

Furthermore, the receiving module is further used for receiving aerial information pushed by the supervision server, the aerial information at least comprising longitude and latitude of a sensitive region, and the sensitive region comprising at least one of the following: a flight restricted region and a flight prohibited region; and
- the control module is further used for acquiring information about a map, displaying the map on the display screen of the control terminal, and marking the sensitive region on the map according to the aerial information.

Furthermore, the monitoring module further comprises a prompt module, the prompt module being used for prompting the flight restriction instruction and/or warning information by means of voice, or displaying the flight restriction instruction and/or warning information by means of text.

Furthermore, the receiving module is further used for receiving aerial information pushed by the supervision server; and the control module is further used for controlling the communication apparatus to automatically forward the aerial information to the unmanned aerial vehicle, the aerial information at least comprising longitude and latitude of a sensitive region, and the sensitive region comprising at least one of the following: a flight restricted region and a flight prohibited region.

Furthermore, the monitoring system further comprises a setting module, the setting module being used for:
- switching, after having established a communication connection with the supervision server, the mode of the control terminal to an on-line mode, and sending an on-line signal to the unmanned aerial vehicle via the communication apparatus, so as to set the flight mode of the unmanned aerial vehicle to an on-line flight mode; and
- switching, after having terminated the communication connection with the supervision server, the mode of the control terminal to an off-line mode, and sending an off-line signal to the unmanned aerial vehicle via the communication apparatus, so as to set the flight mode of the unmanned aerial vehicle to an off-line flight mode.

Furthermore, the receiving module is further used for storing, when the control terminal receives in the off-line mode off-line flight information sent by the unmanned aerial vehicle, the received off-line flight information, and the control module is further used for controlling, when the mode of the control terminal is switched to the on-line mode, the communication apparatus to send the off-line flight information to the supervision server; or
- the receiving module is further used for receiving, when the mode of the control terminal is switched from the off-line mode to the on-line mode, the off-line flight information sent by the unmanned aerial vehicle, and the control module is further used for controlling the communication apparatus to automatically forward the off-line flight information to the supervision server.

A processor, which is applied in a control terminal, is used for acquiring program instructions stored in a storage apparatus to perform the steps of:
- respectively establishing communication connections with the unmanned aerial vehicle and a supervision server;
- receiving identity information about the unmanned aerial vehicle and flight information about the unmanned aerial vehicle sent by the unmanned aerial vehicle;
- automatically sending the identity information about the unmanned aerial vehicle and the flight information to the supervision server in an on-line mode;
- receiving a flight restriction instruction and/or warning information sent by the supervision server; and
- forwarding the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

Furthermore, the warning information comprises at least one of the following: heading change information, speed lowering information and altitude lowering information, and the flight restriction instruction comprises at least one of the following: a forced heading change instruction, a forced landing instruction, a forced speed lowering instruction and a forced altitude lowering instruction.

A memory, which is applied in a control terminal, is used for storing program instructions, wherein the program instructions can be acquired by a processor to perform the steps of:
- respectively establishing communication connections with the unmanned aerial vehicle and a supervision server;
- receiving identity information about the unmanned aerial vehicle and flight information about the unmanned aerial vehicle sent by the unmanned aerial vehicle;
- automatically sending the identity information about the unmanned aerial vehicle and the flight information to the supervision server in an on-line mode;
- receiving a flight restriction instruction and/or warning information sent by the supervision server; and
- forwarding the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

Furthermore, the warning information comprises at least one of the following: heading change information, speed lowering information and altitude lowering information, and the flight restriction instruction comprises at least one of the following: a forced heading change instruction, a forced landing instruction, a forced speed lowering instruction and a forced altitude lowering instruction.

A supervision method for a flight state of an unmanned aerial vehicle, applied in an unmanned aerial vehicle, comprises the steps of:
- establishing a communication connection with a control terminal of the unmanned aerial vehicle;
- receiving and storing an off-line flight certificate sent by the control terminal, the off-line flight certificate comprising off-line flight parameters; and monitoring and restricting, when the unmanned aerial vehicle is in an off-line flight mode, flight behaviour of the unmanned aerial vehicle in the off-line flight mode according to the off-line flight parameters in the off-line flight certificate.

Furthermore, the supervision method further comprises:

receiving an on-line signal sent by the control terminal, and setting the flight mode of the unmanned aerial vehicle to an on-line flight mode; and receiving an off-line signal sent by the control terminal, and setting the flight mode of the unmanned aerial vehicle to an off-line flight mode; and setting, when a flight location of the unmanned aerial vehicle cannot be acquired, the flight mode of the unmanned aerial vehicle to the off-line flight mode.

Furthermore, the supervision method further comprises:

storing, when the flight mode of the unmanned aerial vehicle is the off-line flight mode, flight information about the unmanned aerial vehicle, and sending, when the flight mode of the unmanned aerial vehicle is switched to the on-line flight mode, the stored flight information in the off-line flight mode to the control terminal; or sending, when the flight mode of the unmanned aerial vehicle is the off-line flight mode, the flight information about the unmanned aerial vehicle to the control terminal for storage.

Furthermore, the off-line flight certificate further comprises identity information, the identity information comprising identity information about a user of the unmanned aerial vehicle and identity information about the unmanned aerial vehicle; and the supervision method further comprises:

acquiring, when the flight mode of the unmanned aerial vehicle is set to the off-line flight mode, the identity information about the unmanned aerial vehicle and identity information about the unmanned aerial vehicle in the off-line flight certificate, and verifying whether the identity information about the unmanned aerial vehicle is consistent with the identity information about the unmanned aerial vehicle in the off-line flight certificate; and if the identity information about the unmanned aerial vehicle is inconsistent with the identity information about the unmanned aerial vehicle in the off-line flight certificate, prohibiting starting the unmanned aerial vehicle.

Furthermore, the off-line flight parameters comprise at least: flight region information and a flight time.

Furthermore, the off-line flight parameters further comprise: flight restricted region information, the highest flight altitude, the farthest flight distance, and the maximum flight speed.

Furthermore, the step of monitoring and restricting flight behaviour of the unmanned aerial vehicle in the off-line flight mode according to the off-line flight parameters in the off-line flight certificate specifically comprises:

acquiring flight parameters of and location information about the unmanned aerial vehicle, the flight parameters at least comprising: flight time, a flight altitude, a flight distance, a flight speed and heading; and monitoring, according to the flight region information in the off-line flight certificate, whether the flight location of the unmanned aerial vehicle is within the flight region; and/or monitoring, according to the flight time in the off-line flight certificate, whether the unmanned aerial vehicle flies within the flight time; and/or monitoring, according to the flight restricted region information in the off-line flight certificate, whether the flight location of the unmanned aerial vehicle is within the flight restricted region; and/or monitoring, according to the highest flight altitude in the off-line flight certificate, whether the flight altitude of the unmanned aerial vehicle exceeds the highest flight altitude; and/or monitoring, according to the farthest flight distance in the off-line flight certificate, whether the flight distance of the unmanned aerial vehicle exceeds the farthest flight distance; and/or monitoring, according to the maximum flight speed in the off-line flight certificate, whether the flight speed of the unmanned aerial vehicle exceeds the maximum flight speed.

Furthermore, the step of monitoring and restricting flight behaviour of the unmanned aerial vehicle in the off-line flight mode according to the off-line flight parameters in the off-line flight certificate specifically further comprises:

if the flight location of the unmanned aerial vehicle is outside the flight region, adjusting the heading of the unmanned aerial vehicle so as to control the unmanned aerial vehicle to fly in the flight region, or prohibiting starting the unmanned aerial vehicle; and/or if the unmanned aerial vehicle flies beyond the flight time, prohibiting starting the unmanned aerial vehicle; and/or if the flight location of the unmanned aerial vehicle is within the flight restricted region, adjusting the heading of the unmanned aerial vehicle so as to control the unmanned aerial vehicle to fly outside the flight restricted region, or prohibiting starting the unmanned aerial vehicle; and/or if the flight altitude of the unmanned aerial vehicle exceeds the highest flight altitude, automatically adjusting working parameters of a corresponding power apparatus of the unmanned aerial vehicle so as to lower the flight altitude; and/or if the flight distance of the unmanned aerial vehicle exceeds the farthest flight distance, automatically adjusting working parameters of a corresponding power apparatus of the unmanned aerial vehicle so as to reduce the flight distance; and/or if the flight speed of the unmanned aerial vehicle exceeds the maximum flight speed, automatically adjusting working parameters of a corresponding power apparatus of the unmanned aerial vehicle so as to lower the flight speed.

Furthermore, the supervision method further comprises: updating an unmanned aerial vehicle navigation map according to the off-line flight parameters.

Furthermore, data is transmitted from/to the control terminal via a mobile communication network and/or in a wireless transmission manner, the wireless transmission manner at least comprising a WIFI or Bluetooth transmission manner.

A supervision method for a flight state of an unmanned aerial vehicle, applied in an unmanned aerial vehicle, comprises the steps of:

receiving off-line flight information, the off-line flight information comprising off-line flight parameters; and restricting, when the unmanned aerial vehicle is in an off-line flight mode, flight behaviour of the unmanned aerial vehicle in the off-line flight mode according to the off-line flight parameters.

Furthermore, the off-line flight information is contained in an off-line flight certificate.

Furthermore, the off-line flight certificate is stored in the unmanned aerial vehicle or a control terminal in communication connection with the unmanned aerial vehicle.

Furthermore, the off-line flight parameters comprise at least: flight region information and a flight time.

Furthermore, the off-line flight parameters comprise flight restricted region information.

Furthermore, the supervision method further comprises: updating an unmanned aerial vehicle navigation map according to the off-line flight parameters.

A monitoring system for a flight state of an unmanned aerial vehicle, applied in an unmanned aerial vehicle, comprises:
  a control module for establishing a communication connection with a control terminal of the unmanned aerial vehicle via a communication apparatus of the unmanned aerial vehicle;
  a receiving module for receiving and storing an off-line flight certificate sent by the control terminal, the off-line flight certificate comprising off-line flight parameters; and
  the control module being further used for monitoring and restricting, when the unmanned aerial vehicle is in an off-line flight mode, flight behaviour of the unmanned aerial vehicle in the off-line flight mode according to the off-line flight parameters in the off-line flight certificate.

Furthermore, the monitoring system further comprises a setting module, the setting module being used for setting, when the receiving module has received an on-line signal sent by the control terminal, the flight mode of the unmanned aerial vehicle to an on-line flight mode;
  the setting module being further used for setting, when the receiving module has received an off-line signal sent by the control terminal, the flight mode of the unmanned aerial vehicle to an off-line flight mode; and
  the setting module being further used for setting, when a flight location of the unmanned aerial vehicle cannot be acquired, the flight mode of the unmanned aerial vehicle to the off-line flight mode.

Furthermore, the control module is further used for:
  storing, when the flight mode of the unmanned aerial vehicle is the off-line flight mode, flight information about the unmanned aerial vehicle in the unmanned aerial vehicle, and controlling, when the flight mode of the unmanned aerial vehicle is switched to the on-line flight mode, the communication apparatus to send the stored flight information in the off-line flight mode to the control terminal; or
  sending, when the flight mode of the unmanned aerial vehicle is the off-line flight mode, the flight information about the unmanned aerial vehicle to the control terminal for storage.

Furthermore, the off-line flight certificate further comprises identity information, the identity information comprising identity information about a user of the unmanned aerial vehicle and identity information about the unmanned aerial vehicle; and
  the monitoring system further comprises a verification module for acquiring, when the flight mode of the unmanned aerial vehicle is set to the off-line flight mode, the identity information about the unmanned aerial vehicle and identity information about the unmanned aerial vehicle in the off-line flight certificate, and verifying whether the identity information about the unmanned aerial vehicle is consistent with the identity information about the unmanned aerial vehicle in the off-line flight certificate; and
  the control module is further used for, when the identity information about the unmanned aerial vehicle is inconsistent with the identity information about the unmanned aerial vehicle in the off-line flight certificate, prohibiting starting the unmanned aerial vehicle.

Furthermore, the off-line flight parameters comprise at least: flight region information and a flight time.

Furthermore, the off-line flight parameters further comprise: flight restricted region information, the highest flight altitude, the farthest flight distance, and the maximum flight speed.

Furthermore, when monitoring and restricting flight behaviour of the unmanned aerial vehicle in the off-line flight mode according to the off-line flight parameters in the off-line flight certificate, the control module is specifically used for:
  acquiring flight parameters of and location information about the unmanned aerial vehicle, the flight parameters at least comprising: flight time, a flight altitude, a flight distance, a flight speed and heading; and
  monitoring, according to the flight region information in the off-line flight certificate, whether the flight location of the unmanned aerial vehicle is within the flight region; and/or
  monitoring, according to the flight time in the off-line flight certificate, whether the unmanned aerial vehicle flies within the flight time; and/or
  monitoring, according to the flight restricted region information in the off-line flight certificate, whether the flight location of the unmanned aerial vehicle is within the flight restricted region; and/or
  monitoring, according to the highest flight altitude in the off-line flight certificate, whether the flight altitude of the unmanned aerial vehicle exceeds the highest flight altitude; and/or
  monitoring, according to the farthest flight distance in the off-line flight certificate, whether the flight distance of the unmanned aerial vehicle exceeds the farthest flight distance; and/or
  monitoring, according to the maximum flight speed in the off-line flight certificate, whether the flight speed of the unmanned aerial vehicle exceeds the maximum flight speed.

Furthermore, when monitoring and restricting flight behaviour of the unmanned aerial vehicle in the off-line flight mode according to the off-line flight parameters in the off-line flight certificate, the control module is specifically further used for:
  when the flight location of the unmanned aerial vehicle is outside the flight region, adjusting the heading of the unmanned aerial vehicle so as to control the unmanned aerial vehicle to fly in the flight region, or prohibiting starting the unmanned aerial vehicle; and/or
  when the unmanned aerial vehicle flies beyond the flight time, prohibiting starting the unmanned aerial vehicle; and/or
  when the flight location of the unmanned aerial vehicle is within the flight restricted region, adjusting the heading of the unmanned aerial vehicle so as to control the unmanned aerial vehicle to fly outside the flight restricted region, or prohibiting starting the unmanned aerial vehicle; and/or when the flight altitude of the unmanned aerial vehicle exceeds the highest flight altitude, automatically adjusting working parameters of a corresponding power apparatus of the unmanned aerial vehicle so as to lower the flight altitude; and/or when the flight distance of the unmanned aerial vehicle exceeds the farthest flight distance, automatically adjusting working parameters of a corresponding power apparatus of the unmanned aerial vehicle so as to reduce the flight distance; and/or when the flight speed of the unmanned aerial vehicle exceeds the maximum flight speed, automatically adjusting working parameters of a corresponding power apparatus of the unmanned aerial vehicle so as to lower the flight speed.

Furthermore, the control module is further used for updating an unmanned aerial vehicle navigation map according to the off-line flight parameters.

An unmanned aerial vehicle comprises: a body and a flight parameter collection apparatus, a communication apparatus and a flight controller provided on the body, wherein the flight parameter collection apparatus is used for collecting flight parameters of and location information about the unmanned aerial vehicle in real time; and the flight controller is used for acquiring program instructions stored in a storage apparatus to perform the steps of:

establishing a communication connection with a control terminal of the unmanned aerial vehicle;

receiving and storing an off-line flight certificate sent by the control terminal, the off-line flight certificate comprising off-line flight parameters; and monitoring and restricting, when the unmanned aerial vehicle is in an off-line flight mode, flight behaviour of the unmanned aerial vehicle in the off-line flight mode according to the off-line flight parameters in the off-line flight certificate.

An unmanned aerial vehicle comprises: a body and a flight parameter collection apparatus, a communication apparatus and a flight controller provided on the body, wherein the flight parameter collection apparatus is used for collecting flight parameters of and location information about the unmanned aerial vehicle in real time; and the flight controller is used for acquiring program instructions stored in a storage apparatus to perform the steps of:

receiving off-line flight information, the off-line flight information comprising off-line flight parameters; and restricting, when the unmanned aerial vehicle is in an off-line flight mode, flight behaviour of the unmanned aerial vehicle in the off-line flight mode according to the off-line flight parameters.

A supervision method for a flight state of an unmanned aerial vehicle, applied in an unmanned aerial vehicle, comprises the steps of:

acquiring flight parameters of and location information about the unmanned aerial vehicle, and generating corresponding flight information according to the flight parameters and location information;

establishing a communication connection with a control terminal of the unmanned aerial vehicle; and automatically sending, when the unmanned aerial vehicle is in an on-line flight mode, identity information about the unmanned aerial vehicle and the flight information to the control terminal, and receiving and processing a flight restriction instruction forwarded by the control terminal.

Furthermore, the flight restriction instruction comprises at least one of the following: a forced heading change instruction, a forced landing instruction, a forced speed lowering instruction and a forced altitude lowering instruction.

Furthermore, the supervision method further comprises:

the flight parameters of the unmanned aerial vehicle are adjusted according to the flight restriction instruction to carry out a corresponding flight operation.

Furthermore, the step of adjusting, according to the flight restriction instruction, the flight parameters of the unmanned aerial vehicle to carry out a corresponding flight operation specifically comprises:

regulating, according to the flight restriction instruction, parameters of an electronic speed controller of the unmanned aerial vehicle, so as to regulate working parameters of a corresponding power apparatus of the unmanned aerial vehicle, so as to enable the unmanned aerial vehicle to carry out a corresponding flight operation.

Furthermore, the supervision method further comprises:

receiving and storing aerial information forwarded by the control terminal, the aerial information at least comprising a sensitive region, and the sensitive region comprising at least one of the following: longitude and latitude of a flight restricted region and a flight prohibited region; and updating an unmanned aerial vehicle navigation map according to the aerial information; and monitoring the flight state of the unmanned aerial vehicle according to the flight information and the updated navigation map.

Furthermore, the supervision method further comprises:

receiving an on-line signal sent by the control terminal, and setting the flight mode of the unmanned aerial vehicle to an on-line flight mode; and receiving an off-line signal sent by the control terminal, and setting the flight mode of the unmanned aerial vehicle to an off-line flight mode; and setting, when a flight location of the unmanned aerial vehicle cannot be acquired, the flight mode of the unmanned aerial vehicle to the off-line flight mode.

Furthermore, data is transmitted from/to the control terminal via a mobile communication network and/or in a wireless transmission manner, the wireless transmission manner at least comprising a WIFI or Bluetooth transmission manner.

A supervision method for a flight state of an unmanned aerial vehicle, applied in an unmanned aerial vehicle, comprises the steps of:

generating corresponding flight information according to flight parameters of the unmanned aerial vehicle; and providing identity information about the unmanned aerial vehicle and the flight information to the supervision server, and receiving and processing a flight restriction instruction.

Furthermore, the flight parameters of the unmanned aerial vehicle are adjusted according to the flight restriction instruction to carry out a corresponding flight operation.

Furthermore, a communication connection is established with the supervision server directly or indirectly.

Furthermore, the flight restriction instruction is a flight pre-warning instruction or a flight control instruction.

Furthermore, an unmanned aerial vehicle navigation map is updated according to the flight information about the unmanned aerial vehicle.

A monitoring system for a flight state of an unmanned aerial vehicle, applied in an unmanned aerial vehicle, comprises:
- a control module for acquiring flight parameters of and location information about the unmanned aerial vehicle, and generating corresponding flight information according to the flight parameters and location information;
- the control module being further used for establishing a communication connection with a control terminal of the unmanned aerial vehicle via a communication apparatus of the unmanned aerial vehicle;
- the control module being further used for controlling, when the unmanned aerial vehicle is in an on-line flight mode, the communication apparatus to automatically send identity information about the unmanned aerial vehicle and the flight information to the control terminal; and
- a receiving module for receiving and processing a flight restriction instruction forwarded by the control terminal.

Furthermore, the flight restriction instruction comprises at least one of the following: a forced heading change instruction, a forced landing instruction, a forced speed lowering instruction and a forced altitude lowering instruction.

Furthermore, the control module is further used for adjusting, according to the flight restriction instruction, the flight parameters of the unmanned aerial vehicle to carry out a corresponding flight operation.

Furthermore, when adjusting, according to the flight restriction instruction, the flight parameters of the unmanned aerial vehicle to carry out a corresponding flight operation, the control module is specifically used for:
- regulating, according to the flight restriction instruction, parameters of an electronic speed controller of the unmanned aerial vehicle, so as to regulate working parameters of a corresponding power apparatus of the unmanned aerial vehicle, so as to enable the unmanned aerial vehicle to carry out a corresponding flight operation.

Furthermore, the receiving module is further used for receiving and storing aerial information forwarded by the control terminal, the aerial information at least comprising a sensitive region, and the sensitive region comprising at least one of the following: longitude and latitude of a flight restricted region and a flight prohibited region; and
- the control module is further used for updating an unmanned aerial vehicle navigation map according to the aerial information, and monitoring the flight state of the unmanned aerial vehicle according to the flight information and the updated navigation map.

Furthermore, the monitoring system further comprises a setting module, the setting module being used for setting, when the receiving module has received an on-line signal sent by the control terminal, the flight mode of the unmanned aerial vehicle to an on-line flight mode;
- the setting module being further used for setting, when the receiving module has received an off-line signal sent by the control terminal, the flight mode of the unmanned aerial vehicle to an off-line flight mode; and
- the setting module being further used for setting, when a flight location of the unmanned aerial vehicle cannot be acquired, the flight mode of the unmanned aerial vehicle to the off-line flight mode.

An unmanned aerial vehicle comprises: a body and a flight parameter collection apparatus, a communication apparatus and a flight controller provided on the body, wherein the flight parameter collection apparatus is used for collecting flight parameters of and location information about the unmanned aerial vehicle in real time; and
- the flight controller is used for acquiring program instructions stored in a storage apparatus to perform the steps of:
  - acquiring flight parameters of and location information about the unmanned aerial vehicle, and generating corresponding flight information according to the flight parameters and location information;
  - establishing a communication connection with a control terminal of the unmanned aerial vehicle; and
  - automatically sending, when the unmanned aerial vehicle is in an on-line flight mode, identity information about the unmanned aerial vehicle and the flight information to the control terminal, and receiving and processing a flight restriction instruction forwarded by the control terminal.

Furthermore, the flight controller is further used for adjusting, according to the flight restriction instruction, the flight parameters of the unmanned aerial vehicle to carry out a corresponding flight operation.

An unmanned aerial vehicle comprises: a body and a flight parameter collection apparatus, a communication apparatus and a flight controller provided on the body, wherein the flight parameter collection apparatus is used for collecting flight parameters of and location information about the unmanned aerial vehicle in real time; and
- the flight controller is used for acquiring program instructions stored in a storage apparatus to perform the steps of:
  - generating corresponding flight information according to flight parameters of the unmanned aerial vehicle; and
  - providing identity information about the unmanned aerial vehicle and the flight information to the supervision server, and receiving and processing a flight restriction instruction.

Furthermore, the flight controller is further used for adjusting, according to the flight restriction instruction, the flight parameters of the unmanned aerial vehicle to carry out a corresponding flight operation.

A supervision system for a flight state of an unmanned aerial vehicle comprises: a supervision server, a control terminal, and an unmanned aerial vehicle, wherein the supervision server and the unmanned aerial vehicle can perform bidirectional data transmission via the control terminal; and
- the supervision server is used for generating, according to off-line flight application information sent by the control terminal, an off-line flight certificate, and sending same to the unmanned aerial vehicle via the control terminal, wherein the off-line flight certificate comprises off-line flight parameters; and
- monitoring and restricting, when the unmanned aerial vehicle is in an off-line flight mode, flight behaviour of the unmanned aerial vehicle in the off-line flight mode according to the off-line flight parameters in the off-line flight certificate.

Furthermore, the control terminal comprises a mobile device and a remote controller of the unmanned aerial vehicle, which are mutually connected, the mobile device being used for connecting to the supervision server, and the remote controller being used for connecting to the unmanned aerial vehicle; or
- the control terminal is a multifunctional remote controller integrating functions of the mobile device and of the remote controller of the unmanned aerial vehicle.

A supervision system for a flight state of an unmanned aerial vehicle comprises: a supervision server and an unmanned aerial vehicle, wherein the supervision server and the unmanned aerial vehicle can perform bidirectional data transmission directly or indirectly; and the supervision server is used for generating, according to off-line flight application information, an off-line flight certificate, and providing the off-line flight certificate to the unmanned aerial vehicle, wherein the off-line flight certificate comprises off-line flight parameters; and monitoring and restricting, when the unmanned aerial vehicle is in an off-line flight mode, flight behaviour of the unmanned aerial vehicle in the off-line flight mode according to the off-line flight parameters in the off-line flight certificate.

A supervision system for a flight state of an unmanned aerial vehicle comprises: a supervision server, a control terminal, and an unmanned aerial vehicle, wherein the supervision server and the unmanned aerial vehicle can perform bidirectional data transmission via the control terminal; and the unmanned aerial vehicle actively reports in an on-line flight state flight information about the unmanned aerial vehicle to the supervision server via the control terminal; and the supervision server monitors, according to pre-set safe flight parameters, whether the flight information about the unmanned aerial vehicle in the on-line flight mode conforms to a flight safety regulation, and generates, when monitoring that the flight information about the unmanned aerial vehicle in the on-line flight mode violates the flight safety regulation, a corresponding flight restriction instruction and/or warning information, and sends the flight restriction instruction and/or warning information to the control terminal, thereby restricting flight behaviour of the unmanned aerial vehicle in an on-line flight mode via the flight restriction instruction and/or warning information.

Furthermore, the control terminal comprises a mobile device and a remote controller of the unmanned aerial vehicle, which are mutually connected, the mobile device being used for connecting to the supervision server, and the remote controller being used for connecting to the unmanned aerial vehicle; or the control terminal can be a multifunctional remote controller integrating functions of the mobile device and of the remote controller of the unmanned aerial vehicle.

A supervision system for a flight state of an unmanned aerial vehicle comprises: a supervision server and an unmanned aerial vehicle, wherein the supervision server and the unmanned aerial vehicle can perform bidirectional data transmission via the control terminal; and the unmanned aerial vehicle actively reports in an on-line flight state flight information about the unmanned aerial vehicle to the supervision server; and the supervision server monitors, according to pre-set safe flight parameters, whether the flight information about the unmanned aerial vehicle conforms to a flight safety regulation, and generates, when monitoring that the flight information about the unmanned aerial vehicle violates the flight safety regulation, a corresponding flight restriction instruction, and sends the flight restriction instruction to the unmanned aerial vehicle, thereby restricting flight behaviour of the unmanned aerial vehicle in an on-line flight mode via the flight restriction instruction.

The supervision method for a flight state of an unmanned aerial vehicle provided in the present disclosure can effectively supervise flight behaviour of the unmanned aerial vehicle in an off-line flight mode and in an on-line flight mode, which effectively solves the technical problems in the conventional technologies that flight data of a miniature unmanned aerial vehicle cannot be effectively acquired and the flight behaviour of a miniature unmanned aerial vehicle cannot be effectively supervised, and it does not need to add extra hardware, and achieves a low cost

BRIEF DESCRIPTION OF THE ACCOMPANYING DRAWINGS

SYMBOL DESCRIPTION FOR MAIN ELEMENTS

Figure 1:
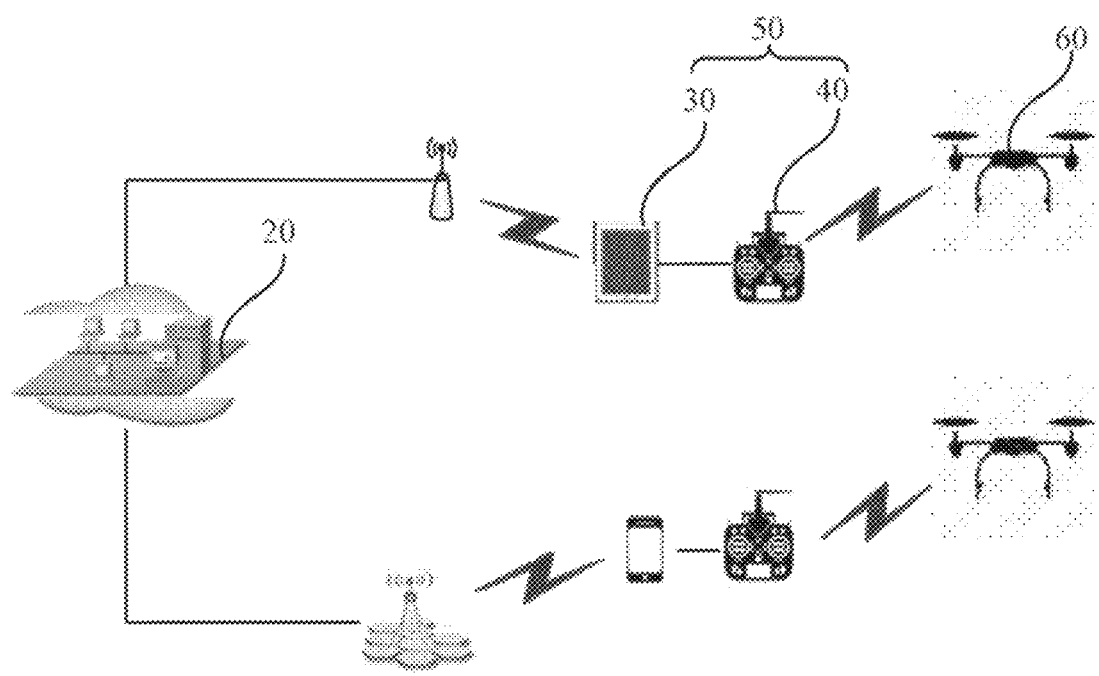
FIG. 1 is a schematic structural diagram of a supervision system for a flight state of an unmanned aerial vehicle in an embodiment of the present disclosure.

Supervision system 100
Supervision server 20
Communication apparatus 21
Storage apparatus 22
Processor 23
Display screen 24
Monitoring system 25
Control module 251
Receiving module 252
Certificate generation module 253
Safety decision-making module 254

Setting module 255
Mobile device 30
Remote controller 40
Control terminal 50
Communication apparatus 51
Storage apparatus 52
Processor 53
Display screen 54
Monitoring system 55
Control module 551
Receiving module 552
Setting module 553
Prompt module 554
Unmanned aerial vehicle 60
Flight parameter collection apparatus 61
Communication apparatus 62
Storage apparatus 63
Flight controller 64
Electronic regulation apparatus 65
Power apparatus 66
Monitoring system 67
Control module 671
Receiving module 672
Setting module 673
Verification module 674
Supervision method 200, 300, 600, 700, 1000, 1100
Step 201-206, 301-304, 601-604, 701-705, 1001-1006, 1101-1105

The following specific embodiments will further describe the present disclosure in conjunction with the accompanying drawings mentioned above.

DETAILED DESCRIPTION OF EMBODIMENTS

The technical solutions in the embodiments of the present disclosure will be clearly and completely described as follows with reference to the drawings in the embodiments of the present disclosure. Clearly, the described embodiments are just some of the embodiments of the present disclosure rather than all the embodiments. All other embodiments obtained by persons of ordinary skill in the art based on the embodiments of the present disclosure without creative efforts shall fall within the scope of protection of the present disclosure.

Please refer to FIG. 1, which is a schematic structural diagram of a supervision system 100 for a flight state of an unmanned aerial vehicle in an embodiment of the present disclosure. The supervision system 100 comprise at least a supervision server 20, a control terminal 50, and an unmanned aerial vehicle 60. In the present embodiment, the supervision server 20 can establish a communication connection with the control terminal 50, the control terminal 50 can establish a communication connection with the unmanned aerial vehicle 60, and the supervision server 20 and the unmanned aerial vehicle 60 can perform bidirectional data transmission via the control terminal 50. In other embodiments, the supervision server 20 and the unmanned aerial vehicle 60 can perform bidirectional data transmission directly.

In the present embodiment, the supervision server 20 can generate, according to off-line flight application information pre-applied by a user of the unmanned aerial vehicle 60, an off-line flight certificate, and send same to the unmanned aerial vehicle 60 via the control terminal 50. After having installed the off-line flight certificate, when in an off-line flight mode, the unmanned aerial vehicle 60 monitors and restricts the flight behaviour of the unmanned aerial vehicle 60 in the off-line flight mode according to off-line flight parameters in the off-line flight certificate, i.e. the flight behaviour of the unmanned aerial vehicle 60 in the off-line flight state is restricted by flight parameters set in the off-line flight certificate, so the supervision server 20 can also control the unmanned aerial vehicle 60 to fly within a safe range when the unmanned aerial vehicle 60 is in the off-line flight state.

In the present embodiment, the unmanned aerial vehicle 60 can also actively report real-time flight information to the supervision server 20 via the control terminal 50 in an on-line flight state, so that the supervision server 20 monitors the flight behaviour of the unmanned aerial vehicle 60. The supervision server 20 monitors, according to pre-set safe flight parameters, whether the flight information about the unmanned aerial vehicle 60 in the on-line flight mode conforms to a flight safety regulation, and generates, when it is monitored that the flight information about the unmanned aerial vehicle 60 in the on-line flight mode violates the flight safety regulation, a corresponding flight restriction instruction and/or warning information, and sends the flight restriction instruction and/or warning information to the control terminal 50, thereby restricting flight behaviour of the unmanned aerial vehicle 60 in an on-line flight mode via the flight restriction instruction and/or warning information.

In one embodiment, the control terminal 50 comprises a mobile device 30 and a remote controller 40 of the unmanned aerial vehicle 60 which are mutually connected. The mobile device 30 is used for connecting to the supervision server 20, and the remote controller 40 is connected to the unmanned aerial vehicle 60. The mobile device 30 comprises but is not limited to a smart phone, a tablet computer.

The supervision server 20 can establish a communication connection with the mobile device 30 via a mobile communication network, e.g. a 2G, 3G, 4G or 5G network, and/or in a wireless access manner, e.g. a WIFI access manner. The supervision server 20 and the mobile device 30 can perform communication and data transmission via an Https communication protocol.

The mobile device 30 can establish a communication connection with the remote controller 40 via a USB serial port connection, and perform communication and data transmission via an WI protocol (IOS) or OTG protocol (Android). Alternatively, the remote controller 40 can also establish a communication connection with the mobile device 30 via a wireless transmission technique, e.g. a 2.4 GHz or 5 GHz wireless technique.

The remote controller 40 can establish a communication connection with the unmanned aerial vehicle 60 via a wireless transmission technique, e.g. a 2.4 GHz or 5 GHz wireless technique.

In another embodiment, the control terminal 50 can be a multifunctional remote controller integrating functions of the mobile device 30 and of the remote controller 40 of the unmanned aerial vehicle 60.

Figure 2:
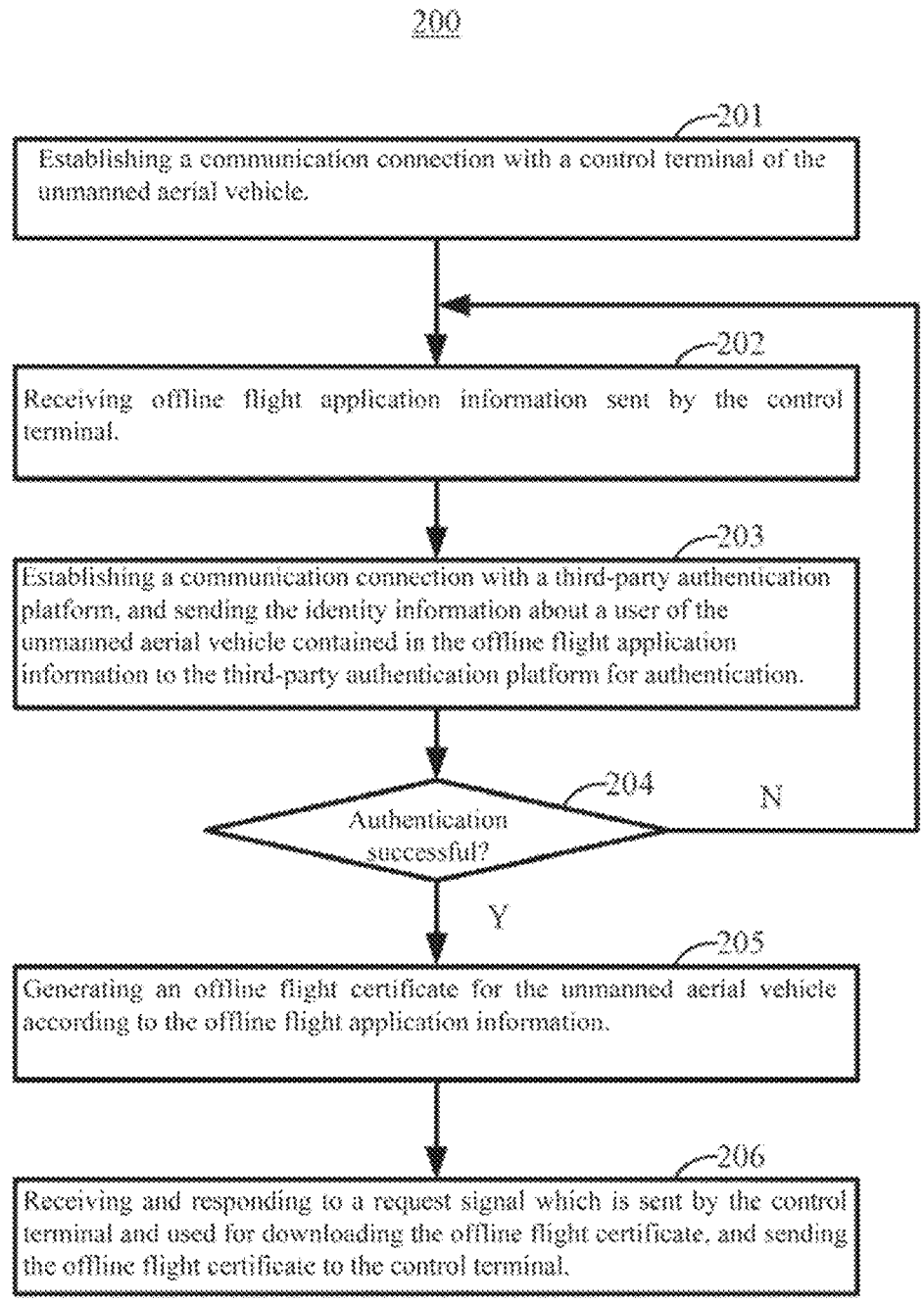
FIG. 2 is a schematic flow chart of a supervision method for a flight state of an unmanned aerial vehicle applied in a supervision server in an embodiment of the present disclosure.

Specifically, please refer to FIG. 2, which is a schematic flow chart of a supervision method 200 for a flight state of an unmanned aerial vehicle applied in a supervision server in an embodiment of the present disclosure. The method in the embodiment of the present disclosure can be implemented by a processor. It should be noted that the method of the embodiment of the present disclosure is not limited to the steps and sequence in the flow chart shown in FIG. 2. According to different embodiments, the steps in the flow chart shown in FIG. 2 can be added, removed, or the order thereof can be changed. In the present embodiment, the supervision method 200 may start with step 201.

Step 201, establishing a communication connection with a control terminal of the unmanned aerial vehicle.

Step 202, receiving off-line flight application information sent by the control terminal.

In the present embodiment, the off-line flight application information comprises identity information and off-line flight parameters, the identity information comprising identity information about a user of the unmanned aerial vehicle and identity information about the unmanned aerial vehicle, e.g. the serial number (SN) of the unmanned aerial vehicle, and the off-line flight parameters at least comprising: flight region information and a flight time. In other embodiments, the off-line flight parameters at least may further comprise: the highest flight altitude, the farthest flight distance, and the maximum flight speed. The identity information about the user is also referred to as "user identity information" and the identity information about the unmanned aerial vehicle included in the off-line flight application information is also referred to as "vehicle identity information."

In the present embodiment, the supervision method 200 may receive the off-line flight application information via an on-line application platform. The off-line flight application information may be registered in the on-line application platform via the control terminal, the mobile device or a remote controller of the unmanned aerial vehicle, and may also be registered in the on-line application platform via other communication apparatuses such as a computer.

In one embodiment, step 202 may specifically comprise:
providing a front-end application interface for the off-line flight certificate, and displaying the front-end application interface on the control terminal; and
receiving the off-line flight application information input in the front-end application interface.

In such a way, a user of the unmanned aerial vehicle can use the control terminal to log into the front-end application interface of the off-line flight certificate to submit the off-line flight application information, which is convenient for the user of the unmanned aerial vehicle to operate.

Step 203, establishing a communication connection with a third-party authentication platform, and sending the identity information about a user of the unmanned aerial vehicle to the third-party authentication platform for authentication.

Step 204, determining whether the third-party authentication platform successfully authenticates the identity information about a user of the unmanned aerial vehicle. If the third-party authentication platform successfully authenticates the identity information about a user of the unmanned aerial vehicle, the method proceeds to step 205, otherwise, the method returns to step 202.

The supervision method 200 of the present embodiment authenticates the real identity of the user via the third-party authentication platform, so as to supervise and trace the responsibility of the user of the unmanned aerial vehicle when a safety accident of the unmanned aerial vehicle occurs.

Step 205, generating an off-line flight certificate for the unmanned aerial vehicle according to the off-line flight application information.

In the present embodiment, the off-line flight certificate contains the off-line flight application information, i.e. comprising identity information and off-line flight parameters, the identity information comprising identity information about a user of the unmanned aerial vehicle and identity information about the unmanned aerial vehicle, and the off-line flight parameters at least comprising: flight region information and a flight time. In other embodiments, the off-line flight parameters at least further comprise: the highest flight altitude, the farthest flight distance, and the maximum flight speed.

In one embodiment, prior to step 205, the method may further comprise:
displaying a back-end application interface for the off-line flight certificate;
receiving approval information in the back-end application interface for the off-line flight parameters input in the front-end application interface, e.g. editing and modifying the off-line flight parameters.

In such a way, a system administrator of the supervision server can approve the off-line flight application information submitted by the user of the unmanned aerial vehicle.

It can be understood that if there is edited and modified off-line flight application information submitted by the user of the unmanned aerial vehicle in the back-end application interface, the off-line flight certificate is generated according to the modified off-line flight parameters.

Step 206, receiving and responding to a request signal which is sent by the control terminal and used for downloading the off-line flight certificate, and sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Optionally, the supervision method 200 may further comprise: updating an unmanned aerial vehicle deployment map according to the off-line flight application information.

Optionally, after the off-line flight certificate is generated, the supervision method 200 may further comprise:
providing a front-end query and modification interface for the off-line flight certificate associated with the identity information about a user of the unmanned aerial vehicle and/or the identity information about the unmanned aerial vehicle, and displaying the front-end query and modification interface on the control terminal;
receiving off-line flight parameters which have been modified in the front-end query and modification interface; and
updating, according to the modified off-line flight parameters, information in the off-line flight certificate, and pushing the updated off-line flight certificate to the corresponding control terminal in real time.

In such a way, the user of the unmanned aerial vehicle may log in the front-end query and modification interface of the off-line flight certificate provided by the supervision server according to actual flight requirements to modify the off-line flight parameters.

Optionally, after the off-line flight certificate is generated, the supervision method 200 may further comprise:
displaying a back-end query and modification interface for the off-line flight certificate associated with the identity information about a user of the unmanned aerial vehicle and/or the identity information about the unmanned aerial vehicle;
receiving off-line flight parameters which have been modified in the back-end query and modification interface; and
updating, according to the modified off-line flight parameters, information in the off-line flight certificate, and pushing the updated off-line flight certificate to the corresponding control terminal in real time.

In such a way, the system administrator of the supervision server may modify the off-line flight parameters according to actual scenario.

In the present embodiment, the supervision method 200 implements communication interaction between the supervision server and the unmanned aerial vehicle via the control terminal.

It can be understood that in another embodiment, the control terminal may also be omitted, and the supervision server may directly interact with the unmanned aerial vehicle, i.e. the supervision server receives the off-line flight application information about the unmanned aerial vehicle, and directly provides the generated off-line flight certificate to the unmanned aerial vehicle, without the need for the intermediate link in the control terminal forwarding the information.

The supervision method 200 of the embodiment of the present disclosure generates an off-line flight certificate according to identity information about a user of the unmanned aerial vehicle and off-line flight parameters reported by the user of the unmanned aerial vehicle on the supervision server, so that when the unmanned aerial vehicle is in an off-line flight mode, it can also monitor whether the flight information about the unmanned aerial vehicle conforms to the reported flight information, thereby restricting flight behaviour of the unmanned aerial vehicle in the off-line flight mode.

Figure 3:
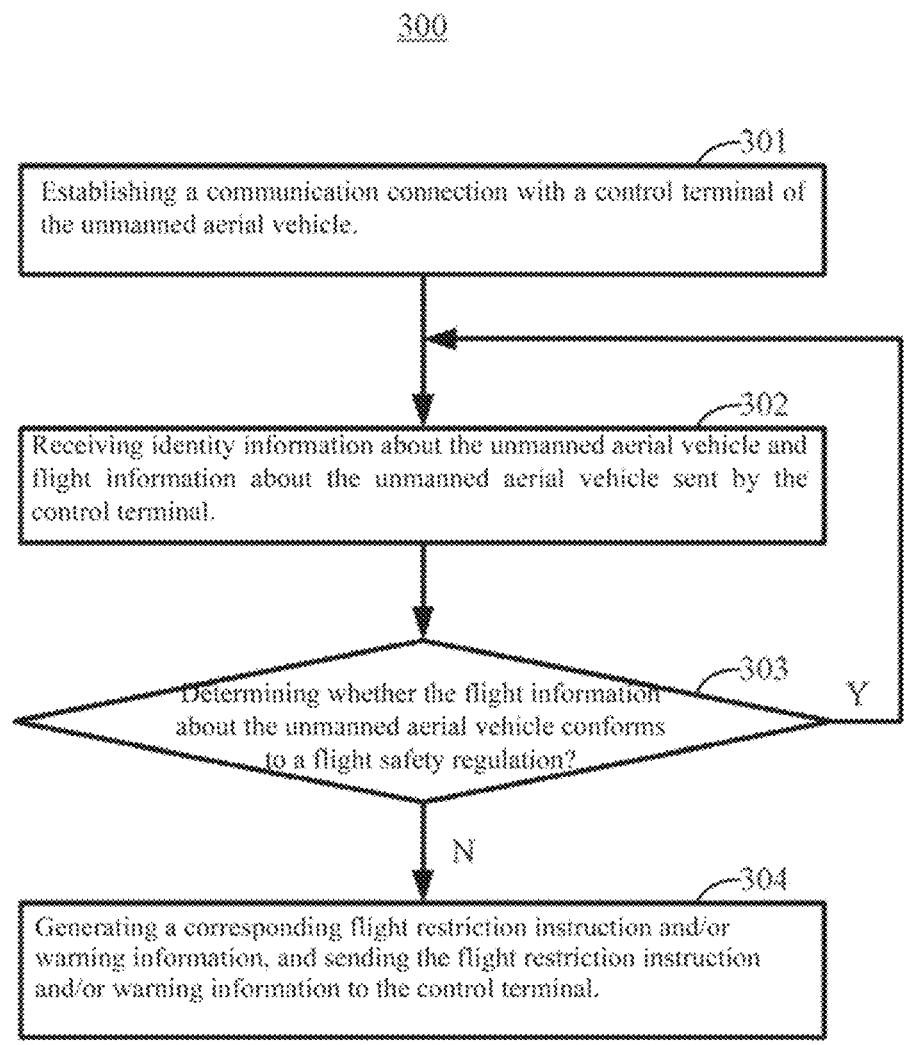
FIG. 3 is a schematic flow chart of another supervision method for a flight state of an unmanned aerial vehicle applied in a supervision server in an embodiment of the present disclosure.

Please refer to FIG. 3, which is a schematic flow chart of another supervision method 300 for a flight state of an unmanned aerial vehicle applied in a supervision server in an embodiment of the present disclosure. The method in the embodiment of the present disclosure can be implemented by a processor. It should be noted that the method of the embodiment of the present disclosure is not limited to the steps and sequence in the flow chart shown in FIG. 3. According to different embodiments, the steps in the flow chart shown in FIG. 3 can be added, removed, or the order thereof can be changed. In the present embodiment, the supervision method 300 may start with step 301.

Step 301, establishing a communication connection with a control terminal of the unmanned aerial vehicle.

Step 302, receiving identity information about the unmanned aerial vehicle and flight information about the unmanned aerial vehicle sent by the control terminal.

In the present embodiment, the supervision method 300 may further comprise: updating an unmanned aerial vehicle deployment map according to the flight information about the unmanned aerial vehicle.

Step 303, determining, according to pre-set safe flight parameters, whether the flight information about the unmanned aerial vehicle conforms to a flight safety regulation. If it is determined that the flight information about the unmanned aerial vehicle in an on-line flight mode violates the flight safety regulation, the method proceeds to step 304. Otherwise, the method returns to step 302.

Step 304, generating a corresponding flight restriction instruction and/or warning information, and sending the flight restriction instruction and/or warning information to the control terminal, thereby restricting flight behaviour of the unmanned aerial vehicle in an on-line flight mode via the flight restriction instruction and/or warning information.

In the present embodiment, the flight information comprise at least location information about and heading of the unmanned aerial vehicle. The pre-set safe flight parameters comprise at least longitude and latitude of a sensitive region associated with the identity information about the unmanned aerial vehicle, the pre-set sensitive region comprising at least one of the following: a region where the flight of the unmanned aerial vehicle is restricted (referred to as "flight restricted region" for short) and a region where the flight of the unmanned aerial vehicle is prohibited (referred to as "flight prohibited region" for short).

The supervision method 300 specifically comprises:
determining, according to the identity information about the unmanned aerial vehicle and the flight information, whether the unmanned aerial vehicle has entered or is about to enter a pre-set sensitive region; and
if it is determined that the unmanned aerial vehicle is about to enter or has entered the pre-set sensitive region, generating a corresponding flight restriction instruction and/or warning information, the warning information at least comprising: heading change information, and the flight restriction instruction being a flight pre-warning instruction or a flight control instruction, comprising at least one of the following: a forced heading change instruction (i.e. an expelling instruction), a forced landing instruction, and a start prohibited instruction.

In the present embodiment, the flight information at least further comprises a variety of flight parameters of the unmanned aerial vehicle, the flight parameters at least comprising: a flight altitude and a flight speed. The pre-set safe flight parameters at least further comprise the highest safe flight altitude and the maximum safe flight speed associated with the identity information about a user of the unmanned aerial vehicle.

The supervision method 300 specifically further comprises:
monitoring the flight state of the unmanned aerial vehicle according to the identity information about the unmanned aerial vehicle and the flight information, and determining whether the flight parameters of the unmanned aerial vehicle exceed the pre-set safe flight parameters; and
if it is determined that the flight parameters of the unmanned aerial vehicle exceed the pre-set safe flight parameters, generating a corresponding flight restriction instruction and/or warning information, the warning information comprising at least one of the following: altitude lowering information and speed lowering information, and the flight restriction instruction comprising at least one of the following: a forced altitude lowering instruction and a forced speed lowering instruction.

In one embodiment, the warning information can be understood as information sent to the control terminal and is used for warning the unmanned aerial vehicle user. The unmanned aerial vehicle user can adjust the flight parameters of the unmanned aerial vehicle in time according to the prompting of the warning information. The flight restriction instruction can be understood as an instruction sent to the unmanned aerial vehicle to control the unmanned aerial vehicle to carry out a corresponding flight operation.

For example, when it is determined for the first time that the unmanned aerial vehicle is about to enter or has entered the pre-set sensitive region, warning information may be sent to the control terminal at first to prompt the unmanned aerial vehicle user to adjust the heading of the unmanned aerial vehicle in time.

If the warning is ineffective, or the flight behaviour of the unmanned aerial vehicle severely violates the flight safety regulation, a flight restriction instruction may also be sent to set the flight controller of the unmanned aerial vehicle to preferentially execute the control instruction of the supervision server, so as to forcibly control the unmanned aerial vehicle to adjust the flight parameters.

Optionally, the supervision method 300 of the present embodiment further comprises:

setting aerial information associated with the identity information about the unmanned aerial vehicle in real time, and pushing the aerial information to the control terminal in real time, the aerial information at least comprising longitude and latitude of a sensitive region, and the sensitive region comprising at least one of the following: a flight restricted region and a flight prohibited region.

In the present embodiment, the step of setting aerial information associated with the identity information about the unmanned aerial vehicle in real time may specifically comprise:

receiving an input parameter, and setting the aerial information associated with the identity information about the unmanned aerial vehicle according to the input parameter;

and/or automatically setting the aerial information associated with the identity information about the unmanned aerial vehicle in real time according to the flight information.

In such a way, the system administrator of the supervision server may edit and modify the aerial information on the supervision server. Alternatively, the supervision server may also determine the flight region of the unmanned aerial vehicle according to the flight information, and automatically push different aerial information in real time, so that the unmanned aerial vehicle user adjusts the flight parameters of the unmanned aerial vehicle in time according to the aerial information.

In the present embodiment, the supervision server implements communication interaction with the unmanned aerial vehicle via the control terminal.

It can be understood that in another embodiment, the control terminal may also be omitted, and the supervision server may directly interact with the unmanned aerial vehicle, i.e. the supervision server may directly receive identity information about the unmanned aerial vehicle and flight information about the unmanned aerial vehicle, and directly send the flight restriction instruction to the unmanned aerial vehicle, without the need for the intermediate link in the control terminal forwarding the information.

The supervision method 300 of the embodiment of the present disclosure enables the supervision server to obtain flight information in time to master the flight state of the unmanned aerial vehicle in real time, which is therefore convenient to supervise and control the unmanned aerial vehicle. The supervision method 300 of the present disclosure may also generate a corresponding flight restriction instruction and/or warning information when it is determined that the flight behaviour of the unmanned aerial vehicle in the on-line flight mode violates the safety regulation, thereby restricting the flight behaviour of the unmanned aerial vehicle in the on-line flight mode via the flight restriction instruction and/or warning information.

Figure 4:
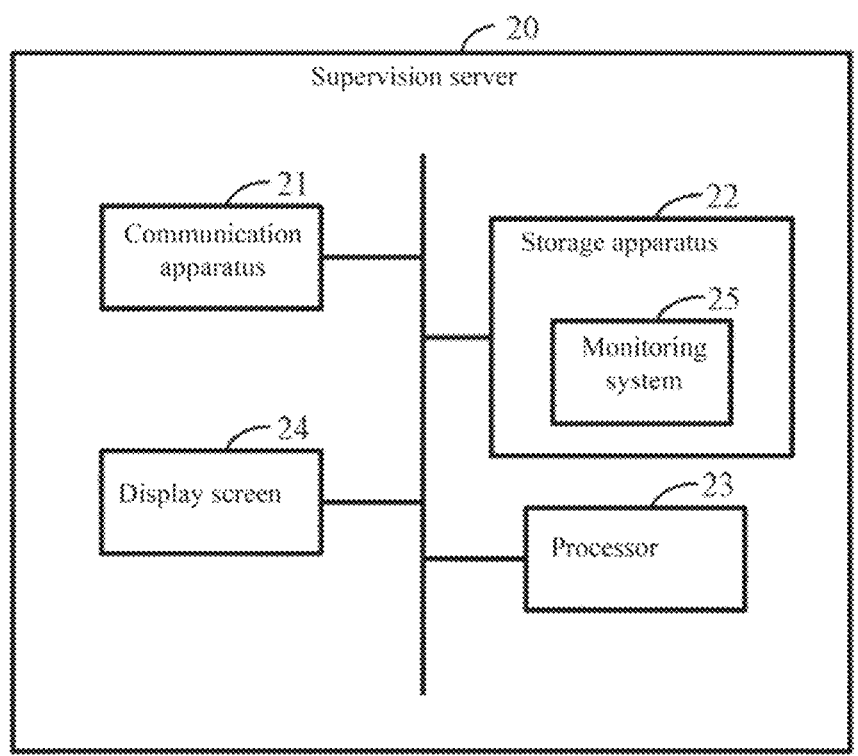
FIG. 4 is a schematic structural diagram of a supervision server in an embodiment of the present disclosure.

Please refer to FIG. 4, which is a schematic structural diagram of a supervision server 20 in an embodiment of the present disclosure. The supervision server 20 comprises but is not limited to a communication apparatus 21, a storage apparatus 22 and a processor 23. The storage apparatus 22 is used for storing various pieces of data of the supervision server 20, e.g. identity information about a user of the unmanned aerial vehicle, identity information about the unmanned aerial vehicle, pre-set safe flight parameters, etc.

The storage apparatus 22 may be the memory of the supervision server 20, and may also be a removable storage apparatus, e.g. a removable media card, an external U-drive, and other flash memories or memories. The processor 23 is used for controlling the operation of the supervision server 20. The processor can be a central processing unit (CPU), a microprocessor, a digital signal processor or other data processing chips.

The communication apparatus 21 is used for establishing a communication connection with a control terminal of the unmanned aerial vehicle.

In the present embodiment, the supervision server 20 further comprises a monitoring system 25, the monitoring system 25 being installed in the storage apparatus 22 in the form of a software program or instruction, and executed by the processor 23. In the present embodiment, the monitoring system 25 can be divided into one or more modules, the one or more modules being stored in the storage apparatus 22 and configured to be executed by one or more processors 23 (one processor 23 in the present embodiment), and by utilizing the monitoring system 25, the supervision server 20 can effectively supervise flight behaviour of the unmanned aerial vehicle in an off-line flight mode and on-line flight mode.

Figure 5:
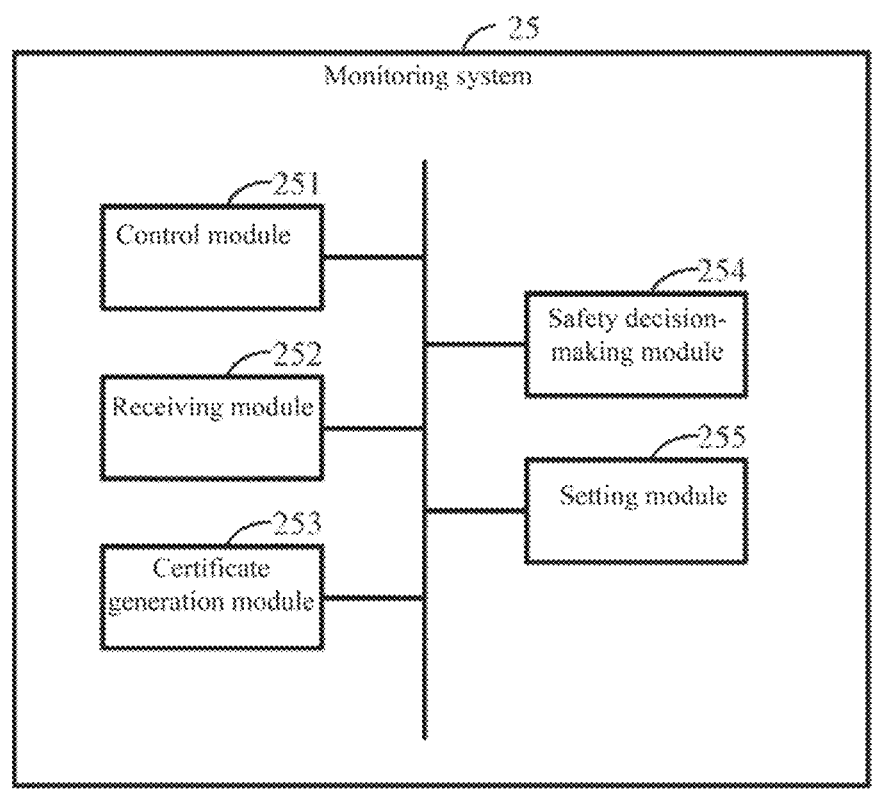
FIG. 5 is a functional module diagram of a monitoring system in the supervision server in FIG. 4.

Please refer to FIG. 5, which is a functional module diagram of a monitoring system 25 in the supervision server 20 in the embodiment of the present disclosure. The monitoring system 25 comprises but is not limited to a control module 251, a receiving module 252, a certificate generation module 253, a safety decision-making module 254, and a setting module 255. The various functional modules mentioned above are a series of program instruction segments which can accomplish specific functions, which are more suitable for describing execution processes of software in a computer than software programs themselves, such as being executed in a processor 23 of the supervision server 20. Therefore, the software programs are described as modules in the present disclosure. In addition, the various functional modules mentioned above may also be implemented as hardware and firmware.

In the present embodiment, the control module 251 is used for establishing a communication connection with a control terminal of the unmanned aerial vehicle via a communication apparatus 21 of the supervision server 20.

The receiving module 252 is used for receiving off-line flight application information sent by the control terminal. In the present embodiment, the off-line flight application information comprises identity information and off-line flight parameters, the identity information comprising identity information about a user of the unmanned aerial vehicle and identity information about the unmanned aerial vehicle, and the off-line flight parameters at least comprising: flight region information and a flight time. In other embodiments, the off-line flight parameters at least may further comprise: the highest flight altitude, the farthest flight distance, and the maximum flight speed.

The receiving module 252 can receive the off-line flight application information via an on-line application platform. The off-line flight application information may be registered in the on-line application platform via the control terminal, the mobile device or a remote controller of the unmanned aerial vehicle, and may also be registered in the on-line application platform via other communication apparatuses 21 such as a computer.

In one embodiment, the certificate generation module 253 is further used for providing a front-end application interface for the off-line flight certificate. The control module 251 is further used for displaying the front-end application interface on the control terminal. The receiving module 252 is further used for receiving the off-line flight application information input in the front-end application interface.

In such a way, a user of the unmanned aerial vehicle can use the control terminal to log into the front-end application interface of the off-line flight certificate to submit the off-line flight application information, which is convenient for the user of the unmanned aerial vehicle to operate.

In the present embodiment, the certificate generation module 253 is used for generating, according to the off-line flight application information, an off-line flight certificate for the unmanned aerial vehicle, wherein the off-line flight certificate contains the off-line flight application information, i.e. comprising identity information and off-line flight parameters, the identity information comprising identity information about a user of the unmanned aerial vehicle and identity information about the unmanned aerial vehicle, and the off-line flight parameters at least comprising: flight region information and a flight time. In other embodiments, the off-line flight parameters at least further comprise: the highest flight altitude, the farthest flight distance, and the maximum flight speed.

In the present embodiment, the control module 251 is further used for establishing a communication connection with a third-party authentication platform, and sending the identity information about a user of the unmanned aerial vehicle to the third-party authentication platform for authentication. The certificate generation module 253 is used for, after the third-party authentication platform successfully authenticates the identity information about a user of the unmanned aerial vehicle, generating, according to the off-line flight application information, the off-line flight certificate.

The supervision server 20 of the present embodiment authenticates the real identity of the user via the third-party authentication platform, so as to supervise and trace the responsibility of the user of the unmanned aerial vehicle when a safety accident of the unmanned aerial vehicle occurs.

In the present embodiment, the certificate generation module 253 is further used for displaying a back-end application interface for the off-line flight certificate on a display screen 24 of the supervision server 20. The receiving module 252 is further used for receiving approval information in the back-end application interface, for the off-line flight parameters input in the front-end application interface, e.g. editing and modifying the off-line flight parameters.

In such a way, a system administrator of the supervision server 20 can approve the off-line flight application information submitted by the user of the unmanned aerial vehicle.

It can be understood that if there is edited and modified off-line flight application information submitted by the user of the unmanned aerial vehicle in the back-end application interface, the certificate generation module 253 generates the off-line flight certificate according to the modified off-line flight parameters The control module 251 is further used for receiving and responding to a request signal which is sent by the control terminal and used for downloading the off-line flight certificate, and sending the off-line flight certificate to the control terminal, so that the off-line flight certificate is sent to the corresponding unmanned aerial vehicle by the control terminal, thereby restricting flight behaviour of the unmanned aerial vehicle in an off-line flight mode according to the off-line flight certificate.

Optionally, the control module 251 can be further used for updating an unmanned aerial vehicle deployment map according to the off-line flight application information.

Optionally, after the off-line flight certificate is generated, the certificate generation module 253 is further used for providing a front-end query and modification interface for the off-line flight certificate associated with the identity information about a user of the unmanned aerial vehicle and/or the identity information about the unmanned aerial vehicle. The control module 251 is further used for displaying the front-end query and modification interface on the control terminal. The receiving module 252 is further used for receiving off-line flight parameters which have been modified in the front-end query and modification interface. The certificate generation module 253 is further used for updating, according to the modified off-line flight parameters, information in the off-line flight certificate. The control module 251 is further used for pushing the updated off-line flight certificate to the corresponding control terminal in real time.

In such a way, the user of the unmanned aerial vehicle may log in the front-end query and modification interface of the off-line flight certificate provided by the supervision server 20 according to actual flight requirements to modify the off-line flight parameters.

Optionally, after the off-line flight certificate is generated, the certificate generation module 253 is further used for displaying a back-end query and modification interface for the off-line flight certificate associated with the identity information about a user of the unmanned aerial vehicle and/or the identity information about the unmanned aerial vehicle on the display screen 24 of the supervision server 20. The receiving module 252 is further used for receiving off-line flight parameters which have been modified in the back-end query and modification interface. The certificate generation module 253 is further used for updating, according to the modified off-line flight parameters, information in the off-line flight certificate. The control module 251 is further used for pushing the updated off-line flight certificate to the corresponding control terminal in real time.

In such a way, the system administrator of the supervision server 20 may modify the off-line flight parameters according to actual scenario.

In the present embodiment, the supervision server 20 implements communication interaction with the unmanned aerial vehicle via the control terminal.

It can be understood that in another embodiment, the control terminal may also be omitted, and the supervision server 20 may directly interact with the unmanned aerial vehicle, i.e. the supervision server 20 receives the off-line flight application information about the unmanned aerial vehicle, and directly provides the generated off-line flight certificate to the unmanned aerial vehicle, without the need of the intermediate link of forwarding the information by the control terminal.

The supervision server 20 of the embodiment of the present disclosure generates an off-line flight certificate according to identity information about a user of the unmanned aerial vehicle and off-line flight parameters reported by the user of the unmanned aerial vehicle, so that when the unmanned aerial vehicle is in an off-line flight mode, it can also monitor whether the flight information about the unmanned aerial vehicle conforms to the reported flight information, thereby restricting flight behaviour of the unmanned aerial vehicle in the off-line flight mode.

In the present embodiment, the receiving module 252 is further used for receiving identity information about the unmanned aerial vehicle and flight information about the unmanned aerial vehicle sent by the control terminal.

Optionally, the control module 251 can be further used for updating an unmanned aerial vehicle deployment map according to the flight information about the unmanned aerial vehicle.

The safety decision-making module 254 is used for determining, according to pre-set safe flight parameters, whether the flight information about the unmanned aerial vehicle conforms to a flight safety regulation, and for generating, when determining that the flight information about the unmanned aerial vehicle violates the flight safety regulation, a corresponding flight restriction instruction and/or warning information.

The control module 251 is further used for controlling the communication apparatus 21 to send the flight restriction instruction and/or warning information to the control terminal, thereby restricting flight behaviour of the unmanned aerial vehicle in an on-line flight mode via the flight restriction instruction and/or warning information.

In the present embodiment, the flight information comprises location information about and heading of the unmanned aerial vehicle. The pre-set safe flight parameters comprise at least longitude and latitude of a sensitive region associated with the identity information about the unmanned aerial vehicle, the pre-set sensitive region comprising at least one of the following: a flight restricted region and a flight prohibited region.

In the present embodiment, the safety decision-making module 254 is specifically used for:

determining, according to the identity information about the unmanned aerial vehicle and the flight information, whether the unmanned aerial vehicle has entered or is about to enter a pre-set sensitive region; and if it is determined that the unmanned aerial vehicle is about to enter or has entered the pre-set sensitive region, generating a corresponding flight restriction instruction and/or warning information, the warning information at least comprising: heading change information, and the flight restriction instruction being a flight pre-warning instruction or a flight control instruction, comprising at least one of the following: a forced heading change instruction, a forced landing instruction, and a start prohibited instruction.

In the present embodiment, the flight information at least further comprises a variety of flight parameters of the unmanned aerial vehicle, the flight parameters at least comprising: a flight altitude and a flight speed. The pre-set safe flight parameters at least further comprise the highest safe flight altitude and the maximum safe flight speed associated with the identity information about a user of the unmanned aerial vehicle.

The safety decision-making module 254 is specifically further used for:

monitoring the flight state of the unmanned aerial vehicle according to the identity information about the unmanned aerial vehicle and the flight information, and determining whether the flight parameters of the unmanned aerial vehicle exceed the pre-set safe flight parameters; and if it is determined that the flight parameters of the unmanned aerial vehicle exceed the pre-set safe flight parameters, generating a corresponding flight restriction instruction and/or warning information, the warning information comprising at least one of the following: altitude lowering information and speed lowering information, and the flight restriction instruction comprising at least one of the following: a forced altitude lowering instruction and a forced speed lowering instruction.

For example, when it is determined for the first time that the unmanned aerial vehicle is about to enter or has entered the pre-set sensitive region, warning information may be sent to the control terminal at first to prompt the unmanned aerial vehicle user to adjust the flight parameters of the unmanned aerial vehicle in time.

If the warning is ineffective, or the flight behaviour of the unmanned aerial vehicle severely violates the flight safety regulation, a flight restriction instruction may also be sent to set the flight controller of the unmanned aerial vehicle to preferentially execute the control instruction of the supervision server 20, so as to force controlling the unmanned aerial vehicle to adjust the flight parameters.

In the present embodiment, the setting module 255 is used for setting aerial information associated with the identity information about the unmanned aerial vehicle in real time. The control module 251 is further used for controlling the communication apparatus 21 to push the aerial information to the control terminal in real time, the aerial information at least comprising longitude and latitude of a sensitive region, and the sensitive region comprising at least one of the following: a flight restricted region and a flight prohibited region.

In the present embodiment, the setting module 255 is specifically used for, when setting aerial information associated with the identity information about the unmanned aerial vehicle in real time:

receiving an input parameter, and setting the aerial information associated with the identity information about the unmanned aerial vehicle according to the input parameter; and/or automatically setting the aerial information associated with the identity information about the unmanned aerial vehicle in real time according to the flight information.

In such a way, the system administrator of the supervision server 20 may edit and modify the aerial information on the supervision server 20. Or the supervision server 20 may also determine the flight region of the unmanned aerial vehicle according to the flight information, and automatically push different aerial information in real time, so that the unmanned aerial vehicle user adjusts the flight parameters of the unmanned aerial vehicle in time according to the aerial information.

In the present embodiment, the supervision server 20 implements communication interaction with the unmanned aerial vehicle via the control terminal.

It can be understood that in another embodiment, the control terminal may also be omitted, and the supervision server 20 may directly interact with the unmanned aerial vehicle, i.e. the supervision server 20 may directly receive identity information about the unmanned aerial vehicle and flight information about the unmanned aerial vehicle, and directly send the flight restriction instruction to the unmanned aerial vehicle, without the need of the intermediate link of forwarding the information by the control terminal.

The supervision server 20 of the embodiment of the present disclosure can obtain flight information in time to master the flight state of the unmanned aerial vehicle in real time, which is therefore convenient to supervise and control the unmanned aerial vehicle. The supervision method of the present disclosure may also generate a corresponding flight restriction instruction and/or warning information when it is determined that the flight behaviour of the unmanned aerial vehicle in the on-line flight mode violates the safety regulation, thereby restricting the flight behaviour of the unmanned aerial vehicle in the on-line flight mode via the flight restriction instruction and/or warning information.

It should be noted that the specific implementation of various functional modules of the monitoring system 25 of the supervision server 20 in the embodiment of the present disclosure may correspondingly refer to the description with regard to relevant steps in corresponding embodiments of FIGS. 2 and 3.

Figure 6:
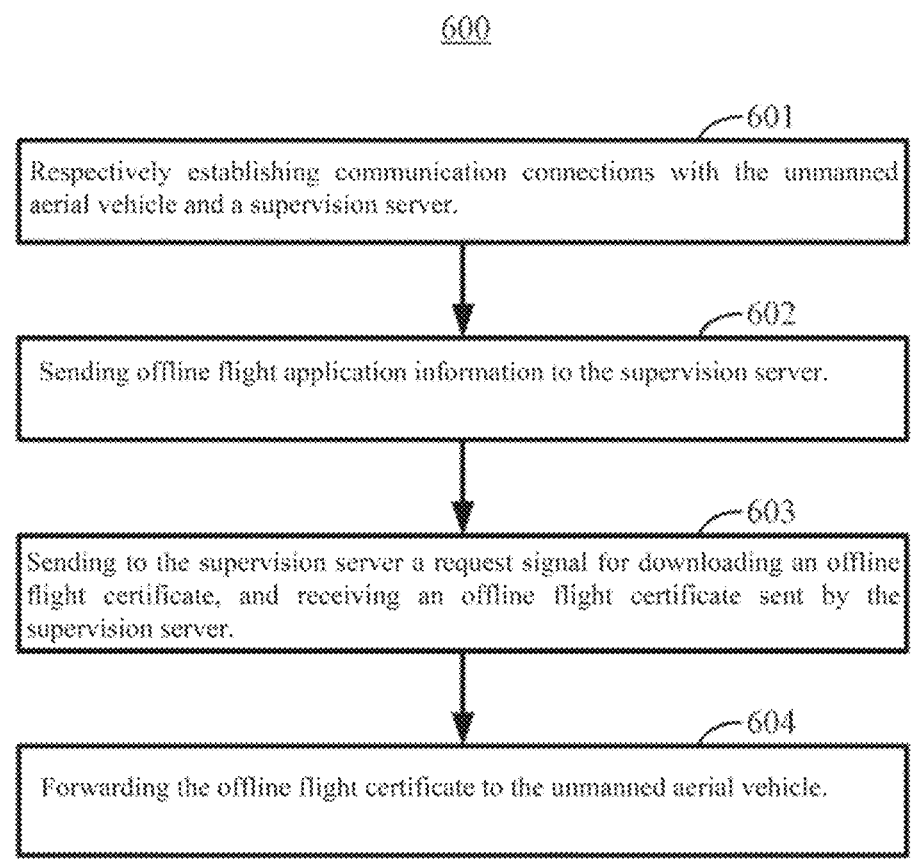
FIG. 6 is a schematic flow chart of a supervision method for a flight state of an unmanned aerial vehicle applied in a control terminal in an embodiment of the present disclosure.

Please refer to FIG. 6, which is a schematic flow chart of a supervision method 600 for a flight state of an unmanned aerial vehicle applied in a control terminal in an embodiment of the present disclosure. The method in the embodiment of the present disclosure can be implemented by a processor. It should be noted that the method of the embodiment of the present disclosure is not limited to the steps and sequence in the flow chart shown in FIG. 6. According to different embodiments, the steps in the flow chart shown in FIG. 6 can be added, removed, or the order thereof can be changed. In the present embodiment, the supervision method 600 may start with step 601.

Step 601, respectively establishing communication connections with the unmanned aerial vehicle and a supervision server.

In the present embodiment, after step 601, the method further comprises:
  switching, after having established a communication connection with the supervision server, the mode of the control terminal to an on-line mode, and sending an on-line signal to the unmanned aerial vehicle, so as to set the flight mode of the unmanned aerial vehicle to an on-line flight mode; and
  switching, after having terminated the communication connection with the supervision server, the mode of the control terminal to an off-line mode, and sending an off-line signal to the unmanned aerial vehicle, so as to set the flight mode of the unmanned aerial vehicle to an off-line flight mode.

The "on-line mode" stated in the present disclosure refers to the fact that the control terminal keeps a communication connection state with the supervision server. The control terminal, in the on-line mode, and the supervision server may perform communication and data transmission via a mobile communication network or in other wireless access manners, e.g. WIFI. The control terminal, in the on-line mode, and the unmanned aerial vehicle may also perform communication and data transmission.

The "on-line flight mode" stated in the present disclosure refers to a flight mode of the unmanned aerial vehicle when the control terminal is in the on-line mode. The unmanned aerial vehicle, in the on-line flight mode, and the control terminal may perform communication and data transmission, and the unmanned aerial vehicle and the supervision server may perform communication and data transmission via the control terminal.

The "off-line mode" stated in the present disclosure refers to the fact that the control terminal has not established a communication connection with the supervision server. The control terminal being in the off-line mode comprises two states: one state is that the control terminal is in a state where no mobile communication network or other wireless access manners, e.g. WIFI, are connected, i.e. the control terminal is in an network-disconnected state; and the other state is that although the control terminal is in a state where a mobile communication network or other wireless access manners, e.g. WIFI, are connected, it is not connected to the supervision server, or the communication connection is terminated after having established the communication connection with the supervision server. The control terminal, in the off-line mode, is unable to perform communication and data transmission to the supervision server, but can perform communication and data transmission with the unmanned aerial vehicle.

The "off-line flight mode" stated in the present disclosure refers to a flight mode of the unmanned aerial vehicle when the control terminal is in the off-line mode, or a flight mode where no GPS information can be collected. The unmanned aerial vehicle can perform communication and data transmission to the control terminal in the off-line flight mode.

Step 602, sending off-line flight application information to the supervision server.

In the present embodiment, the off-line flight application information comprises identity information and off-line flight parameters, the identity information comprising identity information about a user of the unmanned aerial vehicle and identity information about the unmanned aerial vehicle, and the off-line flight parameters at least comprising: flight region information and a flight time. In other embodiments, the off-line flight parameters at least may further comprise: flight restricted region information, the highest flight altitude, the farthest flight distance, and the maximum flight speed.

In one embodiment, the supervision method 600 may send the off-line flight application information via an on-line application platform to the supervision server.

Step 603, sending to the supervision server a request signal for downloading an off-line flight certificate, and receiving an off-line flight certificate sent by the supervision server, wherein the off-line flight certificate contains the off-line flight application information.

Step 604, forwarding the off-line flight certificate to the unmanned aerial vehicle, thereby restricting flight behaviour of the unmanned aerial vehicle in an off-line flight mode according to the off-line flight certificate.

Figure 7:
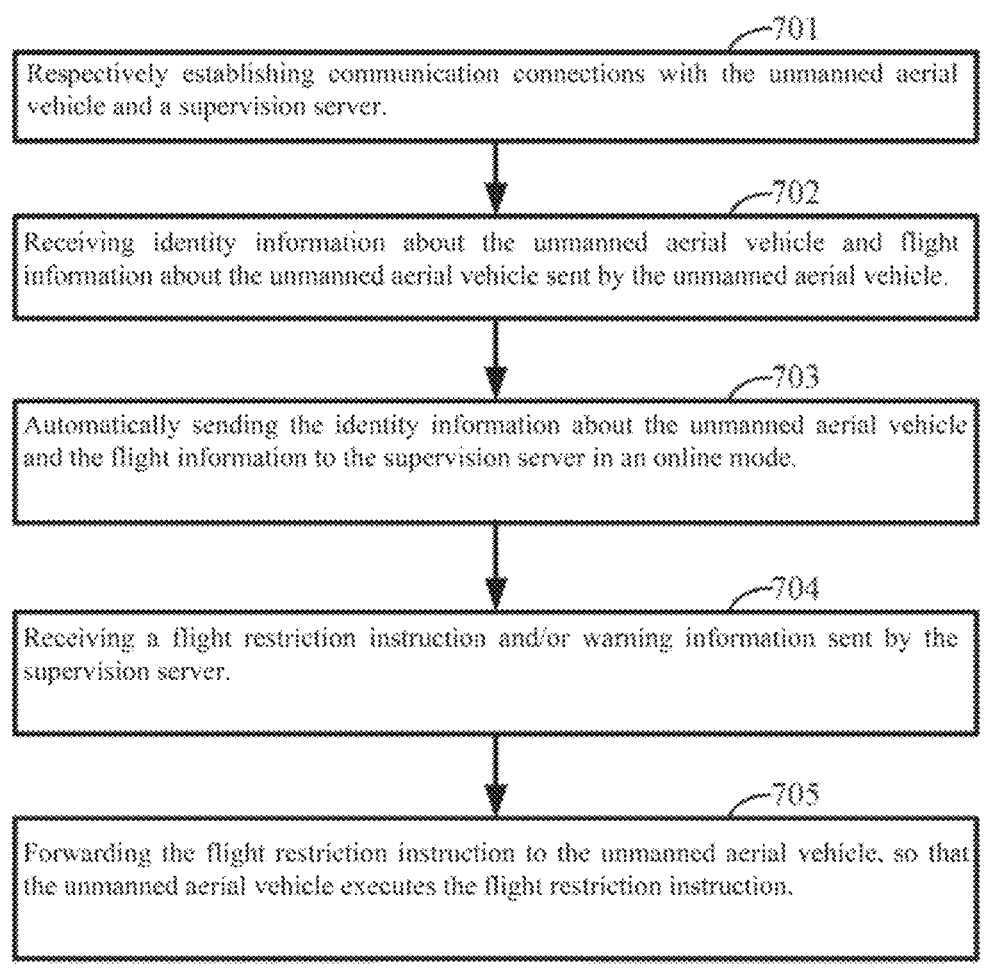
FIG. 7 is a schematic flow chart of another supervision method for a flight state of an unmanned aerial vehicle applied in a control terminal in an embodiment of the present disclosure.

Please refer to FIG. 7, which is a schematic flow chart of another supervision method 700 for a flight state of an unmanned aerial vehicle applied in a control terminal in an embodiment of the present disclosure. The method in the embodiment of the present disclosure can be implemented by a processor. It should be noted that the method of the embodiment of the present disclosure is not limited to the steps and sequence in the flow chart shown in FIG. 7. According to different embodiments, the steps in the flow chart shown in FIG. 7 can be added, removed, or the order thereof can be changed. In the present embodiment, the supervision method 700 may start with step 701.

Step 701, respectively establishing communication connections with the unmanned aerial vehicle and a supervision server.

In the present embodiment, after step 701, the method further comprises:
  switching, after having established a communication connection with the supervision server, the mode of the control terminal to an on-line mode, and sending an on-line signal to the unmanned aerial vehicle, so as to set the flight mode of the unmanned aerial vehicle to an on-line flight mode; and
  switching, after having terminated the communication connection with the supervision server, the mode of the control terminal to an off-line mode, and sending an off-line signal to the unmanned aerial vehicle, so as to set the flight mode of the unmanned aerial vehicle to an off-line flight mode.

Step 702, receiving identity information about the unmanned aerial vehicle and flight information about the unmanned aerial vehicle sent by the unmanned aerial vehicle.

In the present embodiment, the flight information comprises location information about the unmanned aerial vehicle and a variety of flight parameters of the unmanned aerial vehicle, the flight parameters at least comprising: a flight time, a flight altitude, a flight speed and a heading.

The supervision method 700 of the present embodiment may further comprise:

acquiring information about a map, and displaying the map;

marking the location of the unmanned aerial vehicle on the map according to the location information;

and/or, displaying the flight parameters of the unmanned aerial vehicle on the map.

Step 703, automatically sending the identity information about the unmanned aerial vehicle and the flight information to the supervision server in an on-line mode.

In the present embodiment, the supervision method 700 may further comprise:

storing, when the control terminal receives in the off-line mode off-line flight information sent by the unmanned aerial vehicle, the received off-line flight information, and controlling, when the mode of the control terminal is switched to the on-line mode, the communication apparatus to send the off-line flight information to the supervision server; or receiving, when the mode of the control terminal is switched from the off-line mode to the on-line mode, the off-line flight information sent by the unmanned aerial vehicle, and automatically forwarding the off-line flight information to the supervision server.

Step 704, receiving a flight restriction instruction and/or warning information sent by the supervision server.

In the present embodiment, the warning information comprises at least one of the following: heading change information, speed lowering information and altitude lowering information. The flight restriction instruction is a flight pre-warning instruction or a flight control instruction, comprising at least one of the following: a forced heading change instruction, a forced landing instruction, a forced speed lowering instruction and a forced altitude lowering instruction.

Step 705, forwarding the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction.

In one embodiment, the warning information can be understood as information sent to the control terminal and is used for warning the unmanned aerial vehicle user. The unmanned aerial vehicle user can adjust the flight parameters of the unmanned aerial vehicle in time according to the prompting of the warning information. The flight restriction instruction can be understood as an instruction sent to the unmanned aerial vehicle to forcibly control the unmanned aerial vehicle to carry out a corresponding flight operation.

For example, when it is determined for the first time that the unmanned aerial vehicle is about to enter or has entered the pre-set sensitive region, the supervision server may send warning information to the control terminal at first to prompt the unmanned aerial vehicle user to adjust the heading of the unmanned aerial vehicle in time.

If the warning is ineffective, or the flight behaviour of the unmanned aerial vehicle severely violates the flight safety regulation, the supervision server may also set the flight controller of the unmanned aerial vehicle to preferentially execute the control instruction of the supervision server by sending a flight restriction instruction, so as to forcibly control the unmanned aerial vehicle to adjust the flight parameters.

Optionally, the supervision method 700 of the present embodiment may further comprise:

prompting the flight restriction instruction and/or warning information by means of voice; or displaying the flight restriction instruction and/or warning information by means of text, so that the unmanned aerial vehicle user learns the warning information in time, and adjusts the flight parameters of the unmanned aerial vehicle according to the warning information, or the unmanned aerial vehicle user learns the flight restriction instruction currently being executed by the unmanned aerial vehicle in time.

Optionally, the supervision method 700 of the present embodiment further comprises:

receiving aerial information pushed by the supervision server, the aerial information at least comprising longitude and latitude of a sensitive region, and the sensitive region comprising at least one of the following: a flight restricted region and a flight prohibited region;

acquiring information about a map, and displaying the map; and marking a flight restricted region and/or flight prohibited region on the map according to the aerial information.

Optionally, the supervision method 700 of the present embodiment further comprises: automatically forwarding the aerial information to the unmanned aerial vehicle, so that the unmanned aerial vehicle can update the unmanned aerial vehicle navigation map in time.

Figure 8:
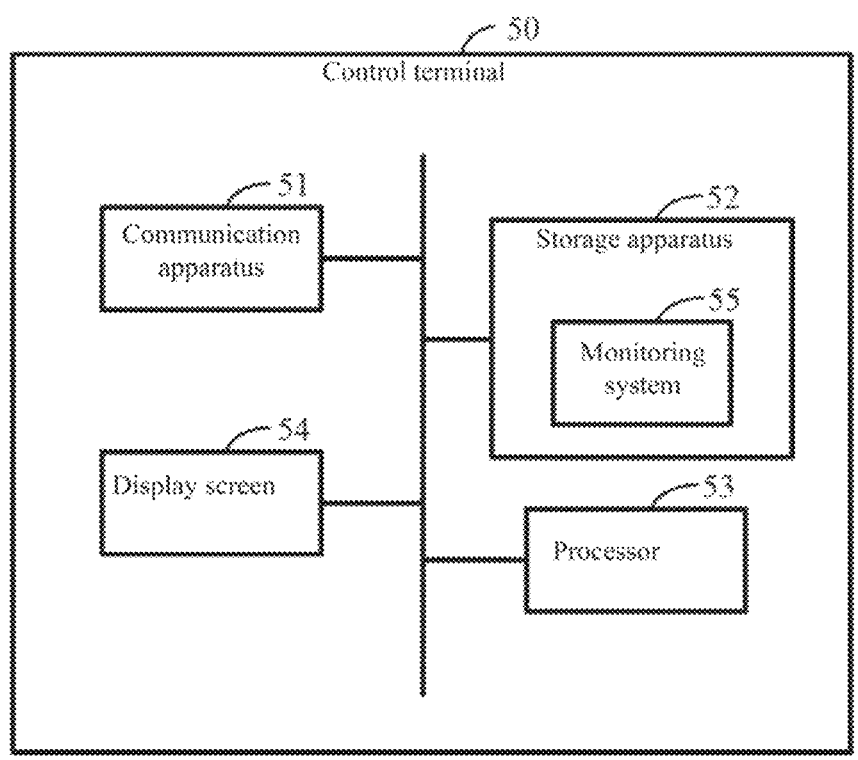
FIG. 8 is a schematic structural diagram of a control terminal in an embodiment of the present disclosure.

Please refer to FIG. 8, which is a schematic structural diagram of a control terminal 50 in an embodiment of the present disclosure. The control terminal 50 comprises but is not limited to a storage apparatus 52, a processor 53 and a communication apparatus 51. The storage apparatus 52 is used for storing various pieces of data of the control terminal 50, e.g. identity information about a user of the unmanned aerial vehicle, identity information about the unmanned aerial vehicle, etc. The storage apparatus 52 may be the memory of the control terminal 50, and may also be a removable storage apparatus, e.g. a removable media card, an external U-drive, and other flash memories or memories. The processor 53 is used for controlling the operation of the control terminal 50. The processor 53 can be a central processing unit (CPU), a microprocessor, a digital signal processor or other data processing chips.

The communication apparatus 51 is used for respectively establishing communication connections with a supervision server and the unmanned aerial vehicle.

In the present embodiment, the control terminal 50 further comprises a monitoring system 55, the monitoring system 55 being installed in the storage apparatus 52 in the form of a software program or instruction, and executed by the processor 53. In the present embodiment, the monitoring system 55 can be divided into one or more modules, the one or more modules being stored in the storage apparatus 52 and configured to be executed by one or more processors 53 (one processor 53 in the present embodiment), and by utilizing the monitoring system 55, the control terminal 50 can effectively monitor flight behaviour of the unmanned aerial vehicle in an off-line flight mode and on-line flight mode.

Figure 9:
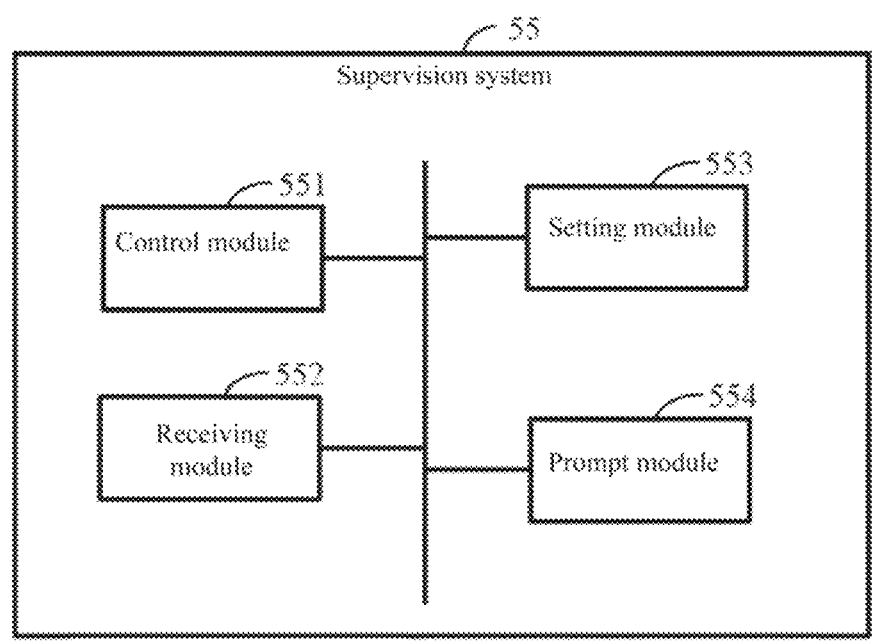
FIG. 9 is a functional module diagram of a monitoring system in the control terminal in FIG. 8.

Please refer to FIG. 9, which is a functional module diagram of a monitoring system 55 in the control terminal 50 in the embodiment of the present disclosure. The monitoring system 55 comprise at least but is not limited to a control module 551, a receiving module 552, and a setting module 553. The various functional modules mentioned above are a series of program instruction segments which can accomplish specific functions, which are more suitable for describing execution processes of software in a computer than software programs themselves, such as being executed in a processor 53 of the control terminal 50. Therefore, the software programs are described as modules in the present disclosure. In addition, the various functional modules mentioned above may also be implemented as hardware and firmware.

In the present embodiment, the control module 551 is used for respectively establishing communication connections with the unmanned aerial vehicle and a supervision server via a communication apparatus 51 of the control terminal 50.

In the present embodiment, the setting module 553 is used for switching, after the communication apparatus 51 has established a communication connection with the supervision server, the mode of the control terminal 50 into an on-line mode. The control module 551 is further used for sending an on-line signal to the unmanned aerial vehicle via the communication apparatus 51, so as to set the flight mode of the unmanned aerial vehicle to an on-line flight mode.

In the present embodiment, the setting module 553 is further used for switching, after the communication apparatus 51 has terminated the communication connection with the supervision server, the mode of the control terminal 50 into an off-line mode. The control module 551 is further used for sending an off-line signal to the unmanned aerial vehicle via the communication apparatus 51, so as to set the flight mode of the unmanned aerial vehicle to an off-line flight mode.

In the present embodiment, the control module 551 is further used for controlling the communication apparatus 51 to send off-line flight application information to the supervision server, and sending to the supervision server a request signal for downloading an off-line flight certificate.

In one embodiment, the control module 551 may send the off-line flight application information via an on-line application platform to the supervision server.

In the present embodiment, the off-line flight application information comprises identity information and off-line flight parameters, the identity information comprising identity information about a user of the unmanned aerial vehicle and identity information about the unmanned aerial vehicle, and the off-line flight parameters at least comprising: flight region information and a flight time. In other embodiments, the off-line flight parameters at least may further comprise: flight restricted region information, the highest flight altitude, the farthest flight distance, and the maximum flight speed.

The receiving module 552 is used for receiving the off-line flight certificate sent by the supervision server. The off-line flight certificate contains the off-line flight application information.

The control module 551 is further used for controlling the communication apparatus 51 to forward the off-line flight certificate to the unmanned aerial vehicle, thereby restricting flight behaviour of the unmanned aerial vehicle in an off-line flight mode according to the off-line flight certificate.

In the present embodiment, the receiving module 552 is further used for receiving identity information about the unmanned aerial vehicle and flight information about the unmanned aerial vehicle sent by the unmanned aerial vehicle.

In the present embodiment, the flight information comprises location information about the unmanned aerial vehicle and a variety of flight parameters of the unmanned aerial vehicle, the flight parameters at least comprising: a flight time, a flight altitude, a flight speed and a heading.

In the present embodiment, the control module 551 is further used for:
acquiring information about a map, and displaying the map on a display screen 54 of the control terminal 50;
marking the location of the unmanned aerial vehicle on the map according to the location information;
and/or, displaying the flight parameters of the unmanned aerial vehicle on the map.

The control module 551 is further used for automatically sending the identity information about the unmanned aerial vehicle and the flight information to the supervision server in an on-line mode via the communication apparatus 51.

In one embodiment, the receiving module 552 is further used for storing, when the control terminal 50 has received off-line flight information sent by the unmanned aerial vehicle in an off-line mode, the received off-line flight information, and the control module 551 is further used for controlling, when the mode of the control terminal 50 is switched to an on-line mode, the communication apparatus 51 to send the off-line flight information to the supervision server.

In another embodiment, the receiving module 552 is further used for receiving, when the mode of the control terminal 50 is switched from the off-line mode to the on-line mode, the off-line flight information sent by the unmanned aerial vehicle, and the control module 551 is further used for controlling the communication apparatus 51 to automatically forward the off-line flight information to the supervision server.

In the present embodiment, the receiving module 552 is further used for receiving a flight restriction instruction and/or warning information sent by the supervision server.

In the present embodiment, the warning information comprises at least one of the following: heading change information, speed lowering information and altitude lowering information, and the flight restriction instruction comprises at least one of the following: a forced heading change instruction, a forced landing instruction, a forced speed lowering instruction and a forced altitude lowering instruction.

The control module 551 is further used for forwarding, when having received the flight restriction instruction, the flight restriction instruction to the unmanned aerial vehicle via the communication apparatus 51, so that the unmanned aerial vehicle executes the flight restriction instruction, thereby restricting flight behaviour of the unmanned aerial vehicle in an on-line flight mode via the flight restriction instruction.

In one embodiment, the warning information can be understood as information sent to the control terminal 50 and is used for warning the unmanned aerial vehicle user. The unmanned aerial vehicle user can adjust the flight parameters of the unmanned aerial vehicle in time according to the prompting of the warning information. The flight restriction instruction can be understood as an instruction sent to the unmanned aerial vehicle to force controlling the unmanned aerial vehicle to carry out a corresponding flight operation.

For example, when it is determined for the first time that the unmanned aerial vehicle is about to enter or has entered the pre-set sensitive region, the supervision server may send warning information to the control terminal 50 at first to prompt the unmanned aerial vehicle user to adjust the heading of the unmanned aerial vehicle in time.

If the warning is ineffective, or the flight behaviour of the unmanned aerial vehicle severely violates the flight safety regulation, the supervision server may also set the flight controller of the unmanned aerial vehicle to preferentially execute the control instruction of the supervision server by sending a flight restriction instruction, so as to force controlling the unmanned aerial vehicle to adjust the flight parameters.

Optionally, the monitoring system 55 further comprises a prompt module 554, wherein the prompt module 554 is used for controlling a voice apparatus (not shown in this figure) of the control terminal 50 to prompt the flight restriction instruction and/or warning information by means of voice, or the prompt module 554 can also be used for displaying the flight restriction instruction and/or warning information by means of text on the display screen 54 of the control terminal 50, so that the unmanned aerial vehicle user learns the warning information in time, and adjusts the flight parameters of the unmanned aerial vehicle according to the warning information, or the unmanned aerial vehicle user learns the flight restriction instruction currently being executed by the unmanned aerial vehicle in time.

Optionally, the receiving module 552 is further used for receiving aerial information pushed by the supervision server, the aerial information at least comprising longitude and latitude of a sensitive region, and the sensitive region comprising at least one of the following: a flight restricted region and a flight prohibited region.

The control module 551 is further used for acquiring information about a map, displaying the map on the display screen 54 of the control terminal 50, and marking the sensitive region on the map according to the aerial information.

Optionally, the receiving module 552 is further used for receiving aerial information pushed by the supervision server. The aerial information at least comprising longitude and latitude of a sensitive region, and the sensitive region comprising at least one of the following: a flight restricted region and a flight prohibited region. The control module 551 is further used for controlling the communication apparatus 51 to automatically forward the aerial information to the unmanned aerial vehicle.

It should be noted that the specific implementation of various functional modules of the monitoring system 55 of the control terminal 50 in the embodiment of the present disclosure may correspondingly refer to the description of relevant steps in corresponding embodiments of FIGS. 6 and 7.

Figure 10:
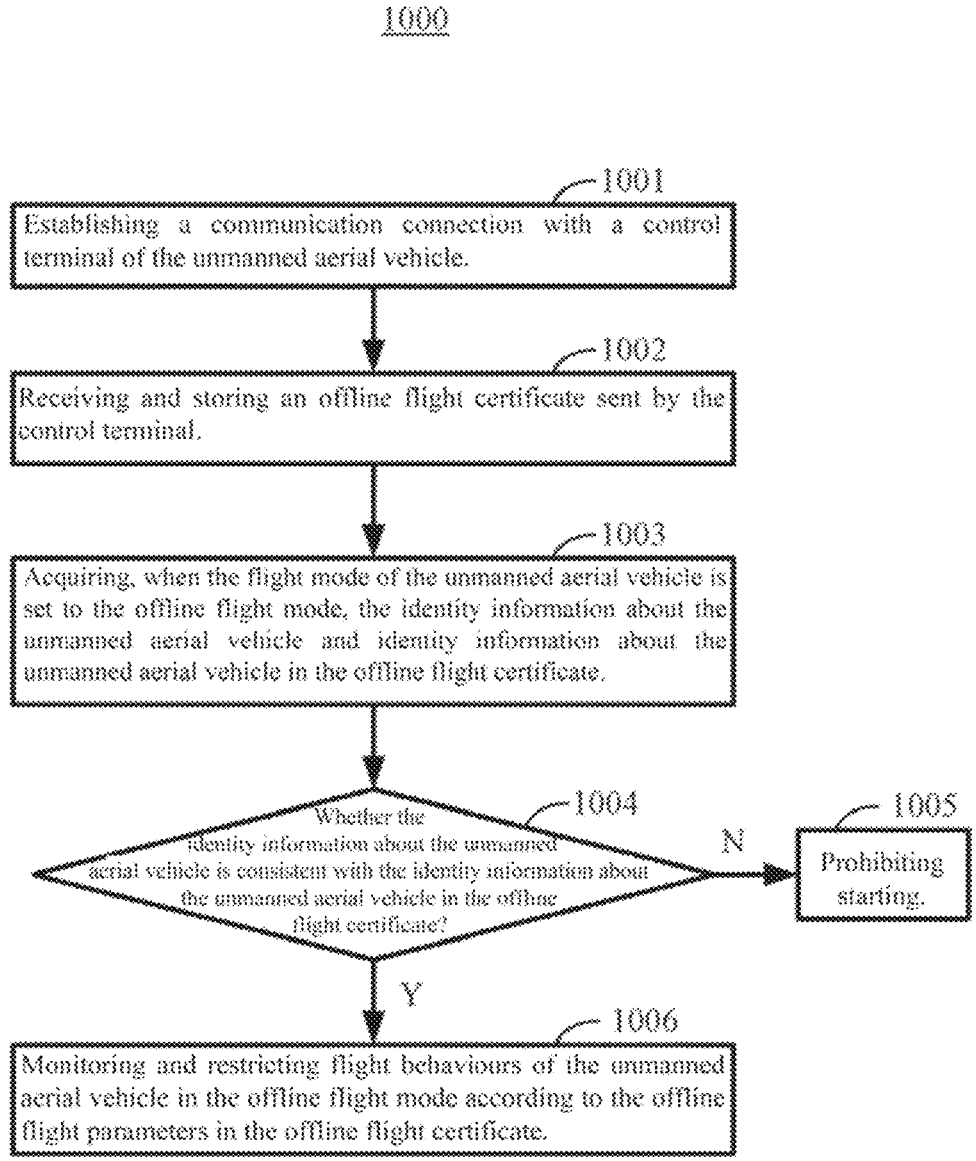
FIG. 10 is a schematic flow chart of a supervision method for a flight state of an unmanned aerial vehicle applied in an unmanned aerial vehicle in an embodiment of the present disclosure.

Please refer to FIG. 10, which is a schematic flow chart of a supervision method 1000 for a flight state of an unmanned aerial vehicle applied in an unmanned aerial vehicle in an embodiment of the present disclosure. The method in the embodiment of the present disclosure can be implemented by a processor. It should be noted that the method of the embodiment of the present disclosure is not limited to the steps and sequence in the flow chart shown in FIG. 10. According to different embodiments, the steps in the flow chart shown in FIG. 10 can be added, removed, or the order thereof can be changed. The method of the embodiment of the present disclosure can be started with step 1001.

Step 1001, establishing a communication connection with a control terminal of the unmanned aerial vehicle.

Step 1002, receiving off-line flight application information sent by the control terminal.

In the present embodiment, the off-line flight certificate comprises identity information and off-line flight parameters, the identity information comprising identity information about a user of the unmanned aerial vehicle and identity information about the unmanned aerial vehicle, and the off-line flight parameters at least comprising: flight region information and a flight time.

In the present embodiment, the off-line flight certificate is stored in the unmanned aerial vehicle. Optionally, the off-line flight certificate may also be stored in the control terminal in communication connection with the unmanned aerial vehicle.

In the present embodiment, the supervision method 1000 further comprises: updating an unmanned aerial vehicle navigation map according to the off-line flight parameters.

In the present embodiment, the supervision method 1000 may further comprise:
  receiving an on-line signal sent by the control terminal, and setting the flight mode of the unmanned aerial vehicle to an on-line flight mode; and
  receiving an off-line signal sent by the control terminal, and setting the flight mode of the unmanned aerial vehicle to an off-line flight mode; and
  setting, when a flight location of the unmanned aerial vehicle cannot be acquired, the flight mode of the unmanned aerial vehicle to the off-line flight mode.

Step 1003, when the flight mode of the unmanned aerial vehicle is set to the off-line flight mode, acquiring the identity information of the unmanned aerial vehicle and identity information about the unmanned aerial vehicle in the off-line flight certificate.

Step 1004, verifying whether the identity information of the unmanned aerial vehicle is consistent with the identity information about the unmanned aerial vehicle in the off-line flight certificate. If the identity information about the unmanned aerial vehicle is inconsistent with the identity information about the unmanned aerial vehicle in the off-line flight certificate, the method proceeds to step 1005. If the identity information about the unmanned aerial vehicle is consistent with the identity information about the unmanned aerial vehicle in the off-line flight certificate, the method proceeds to step 1006.

Step 1005, prohibiting the starting of the unmanned aerial vehicle.

Step 1006, monitoring and restricting flight behaviour of the unmanned aerial vehicle in the off-line flight mode according to the off-line flight parameters in the off-line flight certificate.

In the present embodiment, the supervision method 1000 further comprises:
  storing, when the flight mode of the unmanned aerial vehicle is the off-line flight mode, flight information about the unmanned aerial vehicle, and sending, when the flight mode of the unmanned aerial vehicle is switched to the on-line flight mode, the stored flight information in the off-line flight mode to the control terminal; or
  sending, when the flight mode of the unmanned aerial vehicle is the off-line flight mode, the flight information about the unmanned aerial vehicle to the control terminal for storage.

In one embodiment, the off-line flight parameters further comprise: the highest flight altitude, the farthest flight distance, and the maximum flight speed.

In one embodiment, step 1006 specifically comprises:

acquiring flight parameters of and location information about the unmanned aerial vehicle, the flight parameters at least comprising: flight time, a flight altitude, a flight distance, a flight speed and heading; and monitoring, according to the flight region information in the off-line flight certificate, whether the flight location of the unmanned aerial vehicle is within the flight region; and/or monitoring, according to the flight time in the off-line flight certificate, whether the unmanned aerial vehicle flies within the flight time; and/or monitoring, according to the flight restricted region information in the off-line flight certificate, whether the flight location of the unmanned aerial vehicle is within the flight restricted region; and/or monitoring, according to the highest flight altitude in the off-line flight certificate, whether the flight altitude of the unmanned aerial vehicle exceeds the highest flight altitude; and/or monitoring, according to the farthest flight distance in the off-line flight certificate, whether the flight distance of the unmanned aerial vehicle exceeds the farthest flight distance; and/or monitoring, according to the maximum flight speed in the off-line flight certificate, whether the flight speed of the unmanned aerial vehicle exceeds the maximum flight speed.

In one embodiment, step 1006 specifically further comprises:

if the flight location of the unmanned aerial vehicle is outside the flight region, adjusting the heading of the unmanned aerial vehicle so as to control the unmanned aerial vehicle to fly in the flight region, or prohibiting starting the unmanned aerial vehicle; and/or if the unmanned aerial vehicle flies beyond the flight time, prohibiting starting the unmanned aerial vehicle; and/or if the flight location of the unmanned aerial vehicle is within the flight restricted region, adjusting the heading of the unmanned aerial vehicle so as to control the unmanned aerial vehicle to fly outside the flight restricted region, or prohibiting starting the unmanned aerial vehicle; and/or if the flight altitude of the unmanned aerial vehicle exceeds the highest flight altitude, automatically adjusting working parameters of a corresponding power apparatus of the unmanned aerial vehicle so as to lower the flight altitude; and/or if the flight distance of the unmanned aerial vehicle exceeds the farthest flight distance, automatically adjusting working parameters of a corresponding power apparatus of the unmanned aerial vehicle so as to reduce the flight distance; and/or if the flight speed of the unmanned aerial vehicle exceeds the maximum flight speed, automatically adjusting working parameters of a corresponding power apparatus of the unmanned aerial vehicle so as to lower the flight speed.

In the present embodiment, the supervision method 1000 implements communication interaction between the unmanned aerial vehicle and the supervision server via the control terminal.

It can be understood that in another embodiment, the control terminal may also be omitted, and the unmanned aerial vehicle may directly interact with the supervision server, i.e. the unmanned aerial vehicle directly receives the off-line flight certificate provided by the supervision server, without the need for the intermediate link in the control terminal forwarding the information.

The supervision method 1000 of the embodiment of the present disclosure can effectively restrict the flight of the unmanned aerial vehicle, e.g. region restriction, altitude restriction, distance restriction, speed restriction, etc. according to the off-line flight certificate pre-stored in the unmanned aerial vehicle.

Figure 11:
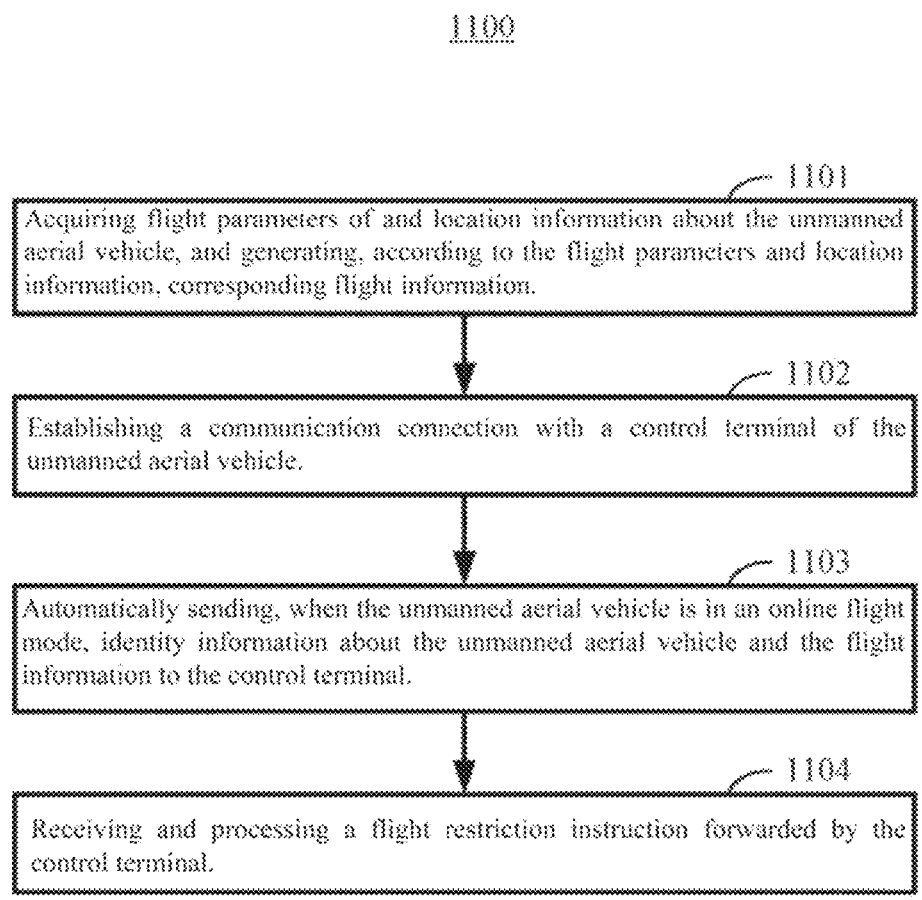
FIG. 11 is a schematic flow chart of a supervision method for a flight state of an unmanned aerial vehicle applied in an unmanned aerial vehicle in an embodiment of the present disclosure.

Please refer to FIG. 11, which is a schematic flow chart of another supervision method 1100 for a flight state of an unmanned aerial vehicle applied in an unmanned aerial vehicle in an embodiment of the present disclosure. The method in the embodiment of the present disclosure can be implemented by a processor. It should be noted that the method of the embodiment of the present disclosure is not limited to the steps and sequence in the flow chart shown in FIG. 11. According to different embodiments, the steps in the flow chart shown in FIG. 11 can be added, removed, or the order thereof can be changed. The method of the embodiment of the present disclosure can be started with step 1101.

Step 1101, acquiring flight parameters of and location information about the unmanned aerial vehicle in real time or regularly, and corresponding flight information is generated according to the flight parameters and location information.

In the present embodiment, the supervision method 1100 further comprises: an unmanned aerial vehicle navigation map is updated according to the flight information about the unmanned aerial vehicle.

Step 1102, establishing a communication connection with a control terminal of the unmanned aerial vehicle.

In the present embodiment, the supervision method 1100 further comprises:

receiving an on-line signal sent by the control terminal, and setting the flight mode of the unmanned aerial vehicle to an on-line flight mode; and receiving an off-line signal sent by the control terminal, and setting the flight mode of the unmanned aerial vehicle to an off-line flight mode; and setting, when a flight location of the unmanned aerial vehicle cannot be acquired, the flight mode of the unmanned aerial vehicle to the off-line flight mode.

Step 1103, when the unmanned aerial vehicle is in an on-line flight mode, automatically sending identity information about the unmanned aerial vehicle and the flight information to the control terminal.

Step 1104, receiving and processing a flight restriction instruction forwarded by the control terminal. The flight restriction instruction comprises at least one of the following: a forced heading change instruction, a forced landing instruction, a forced speed lowering instruction and a forced altitude lowering instruction.

In the present embodiment, step 1104 may specifically comprise: adjusting the flight parameters of the unmanned aerial vehicle according to the flight restriction instruction to carry out a corresponding flight operation.

More specifically, step 1104 may comprise:

regulating, according to the flight restriction instruction, parameters of an electronic speed controller of the unmanned aerial vehicle, so as to regulate working parameters of a corresponding power apparatus of the unmanned aerial vehicle, so as to enable the unmanned aerial vehicle to carry out a corresponding flight operation.

In the present embodiment, the supervision method 1100 further comprises:

receiving and storing aerial information forwarded by the control terminal, the aerial information at least comprising a sensitive region, and the sensitive region comprising at least one of the following: longitude and latitude of a flight restricted region and a flight prohibited region; and updating an unmanned aerial vehicle navigation map according to the aerial information; and monitoring the flight state of the unmanned aerial vehicle according to the flight information and the updated navigation map, for example, monitoring and restricting the flight parameters of the unmanned aerial vehicle.

In the present embodiment, the supervision method 1100 implements communication interaction between the unmanned aerial vehicle and the supervision server via the control terminal.

It can be understood that in another embodiment, the control terminal may also be omitted, and the unmanned aerial vehicle may directly interact with the supervision server, i.e. the unmanned aerial vehicle directly sends identity information about the unmanned aerial vehicle and flight information about the unmanned aerial vehicle to the supervision server, and directly receives the flight restriction instruction, without the need for the intermediate link in the control terminal forwarding the information.

Figure 12:
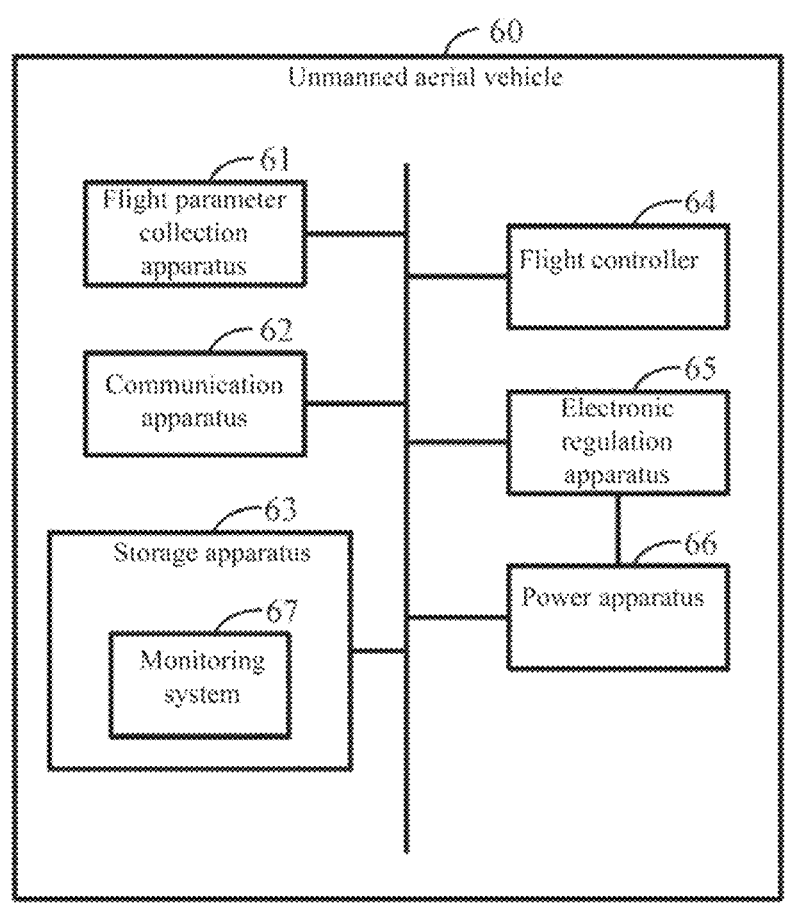
FIG. 12 is a schematic structural diagram of an unmanned aerial vehicle in an embodiment of the present disclosure.

Please refer to FIG. 12, which is a schematic structural diagram of an unmanned aerial vehicle 60 in an embodiment of the present disclosure. The unmanned aerial vehicle 60 comprises but is not limited to a flight parameter collection apparatus 61, a communication apparatus 62, a storage apparatus 63, a flight controller 64, an electronic regulation apparatus 65, and a plurality of power apparatuses 66 for driving the flight of the unmanned aerial vehicle 60.

It should be noted that the unmanned aerial vehicle 60 may further comprise key components of a body, a sensor, a power source, and circuit modules (not shown in this figure) for implementing various functions, etc.

The storage apparatus 63 is used for storing various pieces of data of the unmanned aerial vehicle 60, e.g. flight data of the unmanned aerial vehicle 60, which comprises but is not limited to user identity information, identity information about the unmanned aerial vehicle 60, safe flight parameters, etc. The storage apparatus 63 may be the memory of the unmanned aerial vehicle 60, and may also be a removable storage apparatus, e.g. a removable media card, an external U-drive, and other flash memories or memories. The flight controller 64 is used for controlling the operation of the unmanned aerial vehicle 60. The flight controller 64 can be a central processing unit (CPU), a microprocessor, a digital signal processor or other data processing chips. In the present embodiment, the storage apparatus 63 is a Flash memory. The flight controller 64 is used for the navigation of the unmanned aerial vehicle 60, the recording of flight information, the overall control of the unmanned aerial vehicle 60, e.g. controlling the flight speed, altitude, posture, etc. of the unmanned aerial vehicle 60.

The flight parameter collection apparatus 61 is used for collecting flight parameters and location information about the unmanned aerial vehicle 60 in real time. The flight parameters comprise but are not limited to a flight altitude, a flight distance, a flight speed and heading. Correspondingly, the flight parameter collection apparatus 61 specifically comprises but is not limited to an altitude sensor (not shown in this figure), a speed sensor (not shown in this figure), an inertial measurement unit (not shown in this figure) and a location sensor (not shown in this figure).

The altitude sensor is used for detecting the flight altitude of the unmanned aerial vehicle 60.

The speed sensor is used for detecting the flight speed of the unmanned aerial vehicle 60.

The location sensor is used for detecting the longitude and latitude of the unmanned aerial vehicle 60. The location sensor can be a GPS (global positioning system) positioning sensor and a GNSS (global navigation satellite system) positioning sensor.

The inertial measurement unit is used for detecting information of the flight attitude and heading of the unmanned aerial vehicle 60, etc.

In the present embodiment, the flight control module calculates the flight distance according to the intensity of a signal from the control terminal. In other embodiments, the flight parameter collection apparatus 61 further comprises a ranging sensor for detecting the real-time distance between the unmanned aerial vehicle 60 and the control terminal.

In the present embodiment, when the unmanned aerial vehicle 60 is in the on-line flight mode, the flight controller 64 synchronously transmits the flight information in the on-line flight mode (referred to as "on-line flight information" for short hereinbelow) about the unmanned aerial vehicle 60 back to the control terminal in real time via the remote controller, and the on-line flight information is then automatically sent to the supervision server via the control terminal.

In one embodiment, when the unmanned aerial vehicle 60 is in the off-line flight mode, the flight controller 64 stores the flight information in the off-line flight mode (referred to as "off-line flight information" for short hereinbelow) about the unmanned aerial vehicle 60 in the storage apparatus 63 of the unmanned aerial vehicle 60, and transmits the off-line flight information back to the control terminal via the remote controller upon receiving the on-line signal, and the on-line flight information is then automatically sent to the supervision server via the control terminal.

In another embodiment, when the unmanned aerial vehicle 60 is in the off-line flight mode, the flight controller 64 synchronously transmits the off-line flight information back to the control terminal in real time for storage. When entering the on-line mode, the control terminal automatically sends the stored off-line information to the supervision server.

In the present embodiment, the unmanned aerial vehicle 60 further comprises a monitoring system 67, the monitoring system 67 being installed in the storage apparatus 63 in the form of a software program or instruction, and executed by the flight controller 64. In the present embodiment, the monitoring system 67 can be divided into one or more modules, the one or more modules being stored in the storage apparatus 63 and configured to be executed by the flight controller 64, and by utilizing the monitoring system 67, the unmanned aerial vehicle 60 can effectively monitor and restrict flight behaviour of the unmanned aerial vehicle 60 in the off-line flight mode and on-line flight mode.

Figure 13:
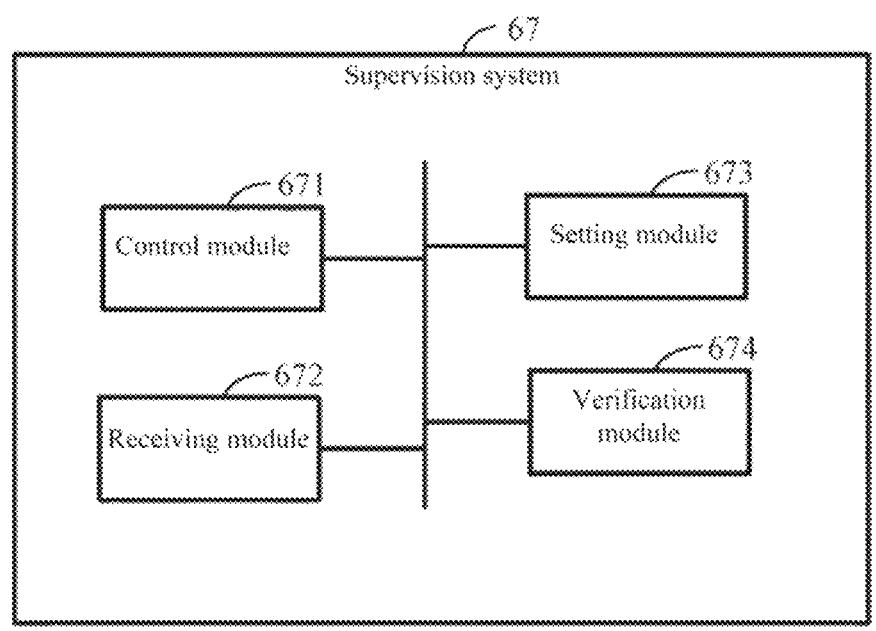
FIG. 13 is a functional module diagram of a monitoring system in the unmanned aerial vehicle in FIG. 12.

Please refer to FIG. 13, which is a functional module diagram of a monitoring system 67 in the unmanned aerial vehicle 60 in the embodiment of the present disclosure. The monitoring system 67 comprise at least but is not limited to a control module 671, a receiving module 672, a setting module 673 and a verification module 674. The various functional modules mentioned above are a series of program instruction segments which can accomplish specific functions, which are more suitable for describing execution processes of software in a computer than software programs themselves, such as being executed in a flight controller 64 of the unmanned aerial vehicle 60. Therefore, the software programs are described as modules in the present disclosure. In addition, the various functional modules mentioned above may also be implemented as hardware and firmware.

The control module 671 is used for acquiring flight parameters and location information about the unmanned aerial vehicle 60 collected by the flight parameter collection apparatus 61 in real time or regularly, and generating corresponding flight information according to the flight parameters and location information.

The control module 671 is further used for establishing a communication connection with a control terminal of the unmanned aerial vehicle 60 via a communication apparatus 62 of the unmanned aerial vehicle 60.

The receiving module 672 is used for receiving and storing an off-line flight certificate sent by the control terminal.

In the present embodiment, the off-line flight certificate comprises identity information and off-line flight parameters, the identity information comprising identity information about a user of the unmanned aerial vehicle 60 and identity information about the unmanned aerial vehicle 60, and the off-line flight parameters at least comprising: flight region information and a flight time.

In the present embodiment, the off-line flight certificate is stored in the unmanned aerial vehicle 60. Optionally, the off-line flight certificate may also be stored in the control terminal in communication connection with the unmanned aerial vehicle 60.

In the present embodiment, the control module 671 is further used for updating an unmanned aerial vehicle 60 navigation map according to the off-line flight parameters.

The setting module 673 used for setting, when the receiving module 672 has received an on-line signal sent by the control terminal, the flight mode of the unmanned aerial vehicle 60 as an on-line flight mode; and for setting, when the receiving module 672 has received an off-line signal sent by the control terminal, the flight mode of the unmanned aerial vehicle 60 as an off-line flight mode; and for setting, when a flight location of the unmanned aerial vehicle 60 cannot be acquired by the control module 671, the flight mode of the unmanned aerial vehicle 60 as the off-line flight mode.

The off-line flight certificate further comprises identity information, the identity information comprising identity information about a user of the unmanned aerial vehicle 60 and identity information about the unmanned aerial vehicle 60.

The verification module 674 is used for acquiring, when the flight mode of the unmanned aerial vehicle 60 is set to the off-line flight mode, the identity information of the unmanned aerial vehicle 60 and identity information about the unmanned aerial vehicle 60 in the off-line flight certificate, and verifying whether the identity information of the unmanned aerial vehicle 60 is consistent with the identity information about the unmanned aerial vehicle 60 in the off-line flight certificate.

The control module 671 is further used for, when the identity information about the unmanned aerial vehicle 60 is inconsistent with the identity information about the unmanned aerial vehicle 60 in the off-line flight certificate, prohibiting starting the unmanned aerial vehicle 60.

The control module 671 is further used for monitoring and restricting, when the unmanned aerial vehicle 60 is in an off-line flight mode, flight behaviour of the unmanned aerial vehicle 60 in the off-line flight mode according to the off-line flight parameters in the off-line flight certificate.

In the present embodiment, the control module 671 is further used for:
storing, when the flight mode of the unmanned aerial vehicle 60 is the off-line flight mode, flight information about the unmanned aerial vehicle 60 in the unmanned aerial vehicle 60, and controlling, when the flight mode of the unmanned aerial vehicle 60 is switched to the on-line flight mode, the communication apparatus 62 to send the stored flight information in the off-line flight mode to the control terminal; or
sending, when the flight mode of the unmanned aerial vehicle 60 is the off-line flight mode, the flight information about the unmanned aerial vehicle 60 to the control terminal for storage.

In one embodiment, the off-line flight parameters further comprise: the highest flight altitude, the farthest flight distance, and the maximum flight speed.

When monitoring and restricting flight behaviour of the unmanned aerial vehicle 60 in the off-line flight mode according to the off-line flight parameters in the off-line flight certificate, the control module 671 is specifically used for:
acquiring flight parameters and location information about the unmanned aerial vehicle 60 in real time or regularly, the flight parameters at least comprising: flight time, a flight altitude, a flight distance, a flight speed and heading; and
monitoring whether the flight location of the unmanned aerial vehicle 60 is within the flight region according to flight region information in the off-line flight certificate; and/or
monitoring whether the unmanned aerial vehicle 60 flies within the flight time according to flight time in the off-line flight certificate; and/or
monitoring whether the flight location of the unmanned aerial vehicle 60 is within the flight restricted region according to flight restricted region information in the off-line flight certificate; and/or
monitoring whether the flight altitude of the unmanned aerial vehicle 60 exceeds the highest flight altitude according to the highest flight altitude in the off-line flight certificate; and/or
monitoring whether the flight distance of the unmanned aerial vehicle 60 exceeds the farthest flight distance according to the farthest flight distance in the off-line flight certificate; and/or
monitoring whether the flight speed of the unmanned aerial vehicle 60 exceeds the maximum flight speed according to the maximum flight speed in the off-line flight certificate.

When monitoring and restricting flight behaviour of the unmanned aerial vehicle 60 in the off-line flight mode according to the off-line flight parameters in the off-line flight certificate, the control module 671 is specifically further used for:
when the flight location of the unmanned aerial vehicle 60 is outside the flight region, adjusting the heading of the unmanned aerial vehicle 60 so as to control the unmanned aerial vehicle 60 to fly in the flight region, or prohibiting starting the unmanned aerial vehicle 60; and/or when the unmanned aerial vehicle 60 flies beyond the flight time, prohibiting starting the unmanned aerial vehicle 60; and/or when the flight location of the unmanned aerial vehicle 60 is within the flight restricted region, adjusting the heading of the unmanned aerial vehicle 60 so as to control the unmanned aerial vehicle 60 to fly outside the flight restricted region, or prohibiting starting the unmanned aerial vehicle 60; and/or when the flight altitude of the unmanned aerial vehicle 60 exceeds the highest flight altitude, automatically adjusting working parameters of the corresponding power apparatus 66 of the unmanned aerial vehicle 60 so as to lower the flight altitude; and/or when the flight distance of the unmanned aerial vehicle 60 exceeds the farthest flight distance, automatically adjusting working parameters of the corresponding power apparatus 66 of the unmanned aerial vehicle 60 so as to reduce the flight distance; and/or when the flight speed of the unmanned aerial vehicle 60 exceeds the maximum flight speed, automatically adjusting working parameters of the corresponding power apparatus 66 of the unmanned aerial vehicle 60 so as to lower the flight speed.

In the present embodiment, the control module 671 is further used for updating an unmanned aerial vehicle 60 navigation map according to the off-line flight parameters.

In the present embodiment, the unmanned aerial vehicle 60 implements communication interaction with the supervision server via the control terminal.

It can be understood that in another embodiment, the control terminal may also be omitted, and the unmanned aerial vehicle 60 may directly interact with the supervision server, i.e. the unmanned aerial vehicle 60 directly receives the off-line flight certificate provided by the supervision server, without the need for the intermediate link in the control terminal forwarding the information.

The unmanned aerial vehicle 60 of the embodiment of the present disclosure can effectively restrict the flight of the unmanned aerial vehicle 60, e.g. region restriction, altitude restriction, distance restriction, speed restriction, etc. by pre-storing the off-line flight certificate.

In the present embodiment, the control module 671 is further used for controlling, when the unmanned aerial vehicle 60 is in an on-line flight mode, the communication apparatus 62 to automatically send identity information about the unmanned aerial vehicle 60 and the flight information to the control terminal.

The receiving module 672 is further used for receiving the flight restriction instruction forwarded by the control terminal, and the control module 671 is further used for adjusting, according to the flight restriction instruction, the flight parameters of the unmanned aerial vehicle 60 to carry out a corresponding flight operation.

The flight restriction instruction comprises at least one of the following: a forced heading change instruction, a forced landing instruction, a forced speed lowering instruction and a forced altitude lowering instruction.

When adjusting, according to the flight restriction instruction, the flight parameters of the unmanned aerial vehicle 60 to carry out a corresponding flight operation, the control module 671 is specifically used for:

regulating, according to the flight restriction instruction, parameters of an electronic speed controller of the unmanned aerial vehicle 60 to regulate working parameters of the corresponding power apparatus 66 of the unmanned aerial vehicle 60, so as to enable the unmanned aerial vehicle 60 to carry out a corresponding flight operation.

The receiving module 672 is further used for receiving and storing aerial information forwarded by the control terminal, the aerial information at least comprising a sensitive region, and the sensitive region comprising at least one of the following: longitude and latitude of a flight restricted region and a flight prohibited region.

The control module 671 is further used for updating an unmanned aerial vehicle 60 navigation map according to the aerial information, and monitoring the flight state of the unmanned aerial vehicle 60 according to the flight information and the updated navigation map.

It should be noted that the specific implementation of various functional modules of the monitoring system 67 of the unmanned aerial vehicle 60 in the embodiment of the present disclosure may correspondingly refer to the description of relevant steps in corresponding embodiments of FIGS. 10 and 11.

On the one hand, by installing the off-line flight certificate, the unmanned aerial vehicle 60 can monitor whether flight information about the unmanned aerial vehicle 60 is consistent with the reported flight information in the off-line flight mode, thereby restricting the flight behaviour of the unmanned aerial vehicle 60 in the off-line flight mode. On the other hand, the flight information is uploaded to the supervision server in real time in the on-line flight mode, so that the supervision server can obtain the flight information in time, so as to master the flight state of the unmanned aerial vehicle 60 in real time, which is convenient for supervising and monitoring the unmanned aerial vehicle 60. When the flight behaviour of the unmanned aerial vehicle 60 in the on-line flight mode violates the safety regulation, the supervision server can also restrict the flight behaviour of the unmanned aerial vehicle 60 in the on-line flight mode by sending the flight restriction instruction and/or warning information.

In addition, by utilizing a variety of wireless communication functions, such as 2G, 3G, 4G, 5G, WIFI, etc. of a control terminal such as a mobile phone, a tablet computer, etc., bidirectional communication and data transmission between the unmanned aerial vehicle 60 and the supervision server can be implemented, thereby uploading the flight data of the unmanned aerial vehicle 60 to the supervision server without the need to add extra hardware devices, which effectively solves the technical problems in the conventional technologies that flight data of a miniature unmanned aerial vehicle 60 cannot be effectively acquired and the flight behaviour of the miniature unmanned aerial vehicle 60 cannot be effectively supervised.

In the present embodiment, the unmanned aerial vehicle 60 implements communication interaction with the supervision server via the control terminal.

It can be understood that in another embodiment, the control terminal may also be omitted, and the unmanned aerial vehicle 60 may directly interact with the supervision server, i.e. the unmanned aerial vehicle 60 directly receives the off-line flight certificate provided by the supervision server, or the unmanned aerial vehicle 60 directly sends identity information about the unmanned aerial vehicle 60 and flight information about the unmanned aerial vehicle 60 to the supervision server, and directly receives the flight restriction instruction, without the need for the intermediate link in the control terminal forwarding the information.

In the several embodiments provided in the present disclosure, it should be understood that the disclosed relevant apparatus and method may be implemented in other ways. For example, the described apparatus embodiment is merely exemplary. For example, the division of the modules or units is merely a logical function division and may be another division in actual implementation. For example, a plurality of units or components may be combined or integrated into another system, or some features may be ignored or not performed. From another point of view, the displayed or discussed mutual coupling or direct coupling or communication connection may be indirect coupling or communication connection of devices or units through some interfaces, and may be in electrical, mechanical or another form.

The units described as separate parts may be or may not be physically separate, and parts displayed as units may be or may not be physical units, and may be located in one place or may be distributed on a plurality of network units. Some of or all the units may be chosen to implement the object of the solution of the embodiment according to actual needs.

In addition, the functional units in the embodiments of the present disclosure may be integrated in a processing unit, or the units singly exist physically, or two or more units are integrated in one unit. The integrated unit may be implemented in the form of hardware or may be implemented in the form of a software functional unit.

Where implemented in the form of software functional unit and sold or used as an independent product, the integrated unit may be stored in a computer readable storage medium. Based on such an understanding, the technical solutions of the present disclosure may be implemented in the form of a software product. The computer software product is stored in a storage medium and includes several instructions for a computer processor to perform all or some of the steps of the methods described in the embodiments of the present disclosure. The aforementioned storage medium comprises: any medium that can store program code, such as a U-drive, a removable hard disk, a read-only memory (ROM), a random access memory (RAM), a magnetic disk, or an optical disc.

Finally, it should be noted that the above embodiments are used to describe the technical solutions of the present disclosure without imposing any limitation thereon. Although the present disclosure is described in detail by referring to the exemplary embodiments, persons of ordinary skill in the art should understand that modifications or equivalent replacements can be made to the technical solutions of the present disclosure without departing from the spirit and scope of the technical solutions of the present disclosure.

What is claimed is:

1. A supervision method for a flight state of an unmanned aerial vehicle comprising:
respectively establishing communication connections with the unmanned aerial vehicle and a supervision server;
receiving identity information about the unmanned aerial vehicle and flight information about the unmanned aerial vehicle sent by the unmanned aerial vehicle;
automatically sending the identity information about the unmanned aerial vehicle and the flight information to the supervision server in an on-line mode;
receiving at least one of a flight restriction instruction or warning information sent by the supervision server;
forwarding the flight restriction instruction to the unmanned aerial vehicle, so that the unmanned aerial vehicle executes the flight restriction instruction, thereby restricting flight behaviour of the unmanned aerial vehicle in an on-line flight mode via the flight restriction instruction;
switching, after having established the communication connection with the supervision server, a mode of a control terminal controlling the unmanned aerial vehicle to an on-line mode, the on-line mode referring to that the control terminal keeps a communication connection state with the supervision server; and
switching, after having terminated the communication connection with the supervision server, the mode of the control terminal to an off-line mode, the off-line mode referring to that the control terminal has not established the communication connection with the supervision server.

2. The supervision method of claim 1, wherein:
the warning information comprises at least one of heading change information, speed lowering information, or altitude lowering information; and
the flight restriction instruction comprises at least one of a forced heading change instruction, a forced landing instruction, a forced speed lowering instruction, or a forced altitude lowering instruction.

3. The supervision method of claim 2,
wherein the flight information comprises location information about the unmanned aerial vehicle and a variety of flight parameters of the unmanned aerial vehicle, the flight parameters at least comprising a flight time, a flight altitude, a flight speed, and a heading;
the supervision method further comprising:
acquiring information about a map, and displaying the map; and
at least one of:
marking a location of the unmanned aerial vehicle on the map according to the location information; or
displaying the flight parameters of the unmanned aerial vehicle on the map.

4. The supervision method of claim 2, further comprising:
receiving aerial information pushed by the supervision server, the aerial information at least comprising longitude and latitude of a sensitive region, and the sensitive region comprising at least one of a flight restricted region or a flight prohibited region;
acquiring information about a map, and displaying the map; and
marking at least one of a flight restricted region or a flight prohibited region on the map according to the aerial information.

5. The supervision method of claim 4, further comprising:
prompting at least one of the flight restriction instruction or the warning information by means of voice; or
displaying at least one of the flight restriction instruction or the warning information by means of text.

6. The supervision method of claim 1, further comprising:
receiving aerial information pushed by the supervision server, and automatically forwarding the aerial information to the unmanned aerial vehicle, the aerial information at least comprising longitude and latitude of a sensitive region, and the sensitive region comprising at least one of a flight restricted region or a flight prohibited region.

7. The supervision method of claim 1, further comprising:
after having established the communication connection with the supervision server, sending an on-line signal to the unmanned aerial vehicle, so as to set a flight mode of the unmanned aerial vehicle to the on-line flight mode; and after having terminated the communication connection with the supervision server, sending an off-line signal to the unmanned aerial vehicle, so as to set the flight mode of the unmanned aerial vehicle to an off-line flight mode.

8. The supervision method of claim 7, further comprising:
storing, in response to receiving in the off-line mode off-line flight information sent by the unmanned aerial vehicle, the received off-line flight information, and controlling, in response to the mode of the control terminal being switched to the on-line mode, a communication apparatus to send the off-line flight information to the supervision server; or
receiving, in response to the mode of the control terminal being switched from the off-line mode to the on-line mode, the off-line flight information sent by the unmanned aerial vehicle, and automatically forwarding the off-line flight information to the supervision server.

9. The supervision method of claim 1, wherein data is transmitted from/to the supervision server via a mobile communication network and/or in a wireless access manner.

10. The supervision method of claim 1, wherein data is transmitted from/to the unmanned aerial vehicle via a mobile communication network and/or in a wireless transmission manner, the wireless access manner comprising a WIFI or Bluetooth manner.

11. A supervision method for a flight state of an unmanned aerial vehicle comprising:
acquiring flight parameters of and location information about the unmanned aerial vehicle, and generating corresponding flight information according to the flight parameters and the location information;
establishing a communication connection with a control terminal of the unmanned aerial vehicle;
automatically sending, when the unmanned aerial vehicle is in an on-line flight mode, identity information about the unmanned aerial vehicle and the flight information to the control terminal, and receiving and processing a flight restriction instruction forwarded by the control terminal;
receiving an on-line signal sent by the control terminal, and setting a flight mode of the unmanned aerial vehicle to the on-line flight mode; and
receiving an off-line signal sent by the control terminal, and setting the flight mode of the unmanned aerial vehicle to an off-line flight mode.

12. A supervision system for a flight state of an unmanned aerial vehicle comprising:
a control terminal;
an unmanned aerial vehicle; and
a supervision server configured to perform bidirectional data transmission with the unmanned aerial vehicle via the control terminal;
wherein:
the unmanned aerial vehicle is configured to actively report, in an on-line flight state, flight information about the unmanned aerial vehicle to the supervision server via the control terminal; and
the supervision server is further configured to perform the supervision method of claim 11.

13. The supervision method of claim 11, wherein the flight restriction instruction comprises at least one of a forced heading change instruction, a forced landing instruction, a forced speed lowering instruction, or a forced altitude lowering instruction.

14. The supervision method of claim 11, further comprising:
adjusting, according to the flight restriction instruction, the flight parameters of the unmanned aerial vehicle to carry out a corresponding flight operation.

15. The supervision method of claim 14, wherein adjusting, according to the flight restriction instruction, the flight parameters of the unmanned aerial vehicle to carry out the corresponding flight operation comprises:
regulating, according to the flight restriction instruction, parameters of an electronic speed controller of the unmanned aerial vehicle, so as to regulate working parameters of a corresponding power apparatus of the unmanned aerial vehicle, so as to enable the unmanned aerial vehicle to carry out the corresponding flight operation.

16. The supervision method of claim 11, further comprising:
receiving and storing aerial information forwarded by the control terminal, the aerial information at least comprising a sensitive region, and the sensitive region comprising longitude and latitude of at least one of a flight restricted region or a flight prohibited region;
updating an unmanned aerial vehicle navigation map according to the aerial information; and
monitoring the flight state of the unmanned aerial vehicle according to the flight information and the updated navigation map.

17. The supervision method of claim 11, further comprising:
setting, in response to being not able to acquire a flight location of the unmanned aerial vehicle, the flight mode of the unmanned aerial vehicle to the off-line flight mode.

18. The supervision method of claim 11, wherein data is transmitted from/to the control terminal via a mobile communication network and/or in a wireless transmission manner, the wireless transmission manner at least comprising a WIFI or Bluetooth transmission manner.

* * * * *